United States Patent
Arakawa et al.

(10) Patent No.: US 7,953,574 B2
(45) Date of Patent: May 31, 2011

(54) METHODS AND APPARATUSES FOR HEAT MANAGEMENT IN INFORMATION SYSTEMS

(75) Inventors: Hiroshi Arakawa, Sunnyvale, CA (US); Yoshiki Kano, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 482 days.

(21) Appl. No.: 12/068,944

(22) Filed: Feb. 13, 2008

(65) Prior Publication Data

US 2009/0077558 A1    Mar. 19, 2009

Related U.S. Application Data

(63) Continuation-in-part of application No. 11/898,948, filed on Sep. 18, 2007, now Pat. No. 7,818,499.

(51) Int. Cl.
*G01K 1/08* (2006.01)
*G01K 3/00* (2006.01)

(52) U.S. Cl. .................................. 702/132; 374/137

(58) Field of Classification Search .......... 702/132, 702/57–58, 60, 81, 84–85, 99, 107, 127, 702/130–131, 136, 182–185; 374/100, 111–112, 374/137; 711/161–162, 165; 709/223–226; 713/300, 320, 340; 718/1, 101–106
See application file for complete search history.

(56) References Cited

U.S. PATENT DOCUMENTS

| | | | |
|---|---|---|---|
| 6,987,673 B1 | 1/2006 | French et al. | 361/727 |
| 7,505,264 B2 * | 3/2009 | Hall et al. | 361/679.33 |
| 2003/0110012 A1 | 6/2003 | Orenstien et al. | 702/188 |
| 2006/0069886 A1 * | 3/2006 | Tulyani | 711/161 |
| 2006/0112286 A1 * | 5/2006 | Whalley et al. | 713/300 |
| 2006/0259621 A1 * | 11/2006 | Ranganathan et al. | 709/226 |
| 2006/0259793 A1 | 11/2006 | Moore et al. | 713/300 |

OTHER PUBLICATIONS

Sharma et al., Balance of Power: Dynamic Thermal Management for Internet data Centers, Jan.-Feb. 2005, IEEE Computer Society, Internet Computing, vol. 9, issue 1, pp. 42-49.*
"Data Sheet: Veritas Cluster Server for VMWare ESX", Symantec Corp., 2006 http://eval.symantec.com/mktginfo/products/Datasheets/High_Availability/cluster_server_datasheet.pdf.
"Data Sheet: Veritas Cluster Server by Symantec", Symantec Corp., 2006 http://eval.symantec.com/mktginfo/products/Datasheets/High_Availability/cluster_server_datasheet.pdf.
"Catalyst 6500 Series Switch Content Switching Module Configuration Note, Software Release 4.2(x)", Cisco Systems, Inc., Dec. 2006.

* cited by examiner

*Primary Examiner* — Eliseo Ramos Feliciano
*Assistant Examiner* — Toan M Le
(74) *Attorney, Agent, or Firm* — Mattingly & Malur, PC

(57) ABSTRACT

In some embodiments, an information system is divided into sections, with one or more first computers located in a first section and one or more second computers located in a second section, including a first temperature sensor sensing a temperature condition for the first section and a second temperature sensor sensing a temperature condition for the second section. In some embodiments, when heat distribution determined from the first and second temperature conditions is not in conformance with a predetermined rule for heat distribution, the information system is configured to relocate a portion of the processing load of the first computers to the second computers, or vice versa, for bringing the heat distribution into conformance with the rule. In some embodiments, the effect of other equipment, such as storage system or switches in the sections is also considered, and loads on this equipment may also be relocated between sections.

18 Claims, 26 Drawing Sheets

FIG. 1

FIG. 3 Parity Group Information

| Parity Group ID | Number of Disks | RAID type | Disk ID | Capacity (GB) |
|---|---|---|---|---|
| 1-1 | 2 | RAID1 | 1-1 | 1024 |
|     |   |       | 1-2 | 1024 |
| 1-2 | 2 | RAID1 | 1-3 | 1024 |
|     |   |       | 1-4 | 1024 |
| 2-1 | 2 | RAID1 | 2-1 | 1024 |
|     |   |       | 2-2 | 1024 |
| 2-2 | 2 | RAID1 | 2-3 | 1024 |
|     |   |       | 2-4 | 1024 |
| : | : | : | : | : |

FIG. 4 Access Information

| Volume ID | Type | Access Load | | | |
|---|---|---|---|---|---|
| | | 6/25/2007 7:00am~8:00am | 6/25/2007 8:00am~9:00am | 6/25/2007 9:00am~10:00am | ... |
| 1 | iops | 10314 | 12072 | 11305 | ... |
|   | MB/s | 40 | 48 | 44 | ... |
| 2 | iops | 20474 | 21234 | 22111 | ... |
|   | MB/s | 80 | 84 | 88 | ... |
| : | : | : | : | : | ... |

| Parity Group ID | Volume ID | Start Address (LBA) | Capacity (MB) |
|---|---|---|---|
| | 2 | 0 | 102400 |
| | Unused | 209715200 | 307200 |
| 1-1 | 4 | 838860800 | 204800 |
| | Unused | 1258291200 | 102400 |
| | : | : | : |
| | Unused | 0 | 204800 |
| | 3 | 419430400 | 204800 |
| 1-2 | 7 | 838860800 | 102400 |
| | Unused | 1048576000 | 307200 |
| | : | : | : |
| : | : | : | : |

FIG. 5 Volume Information

| Area Name | Condition | Parity Group ID |
|---|---|---|
| Low | T < A | 1-1, 1-3, 1-5, ...<br>2-2, 2-4, 2-6, ...<br>3-1, 3-3, 3-5, ... |
| High | A =< T | 1-2, 1-4, 1-6, ...<br>2-1, 2-3, 2-5, ...<br>3-2, 3-4, 3-6, ... |

FIG. 7 Area Information

FIG. 9 Heat Information

```
                    ┌───────┐
                    │ Start │
                    └───┬───┘
                        ▼
    ┌──────────────────────────────────────────────────────┐
    │ Array controller makes an entry in Migration         │
    │ information for the volume to be moved               │──1201
    └──────────────────────┬───────────────────────────────┘
                           ▼
    ┌──────────────────────────────────────────────────────┐
    │ Array controller copies data in the volume to        │
    │ location selected as destination                     │──1202
    └──────────────────────┬───────────────────────────────┘
                           ▼
    ┌──────────────────────────────────────────────────────┐
    │ Array controller updates Volume information and      │
    │ deletes the entry in Migration information           │──1203
    └──────────────────────┬───────────────────────────────┘
                           ▼
                       ┌───────┐
                       │  End  │
                       └───────┘
```

FIG. 11

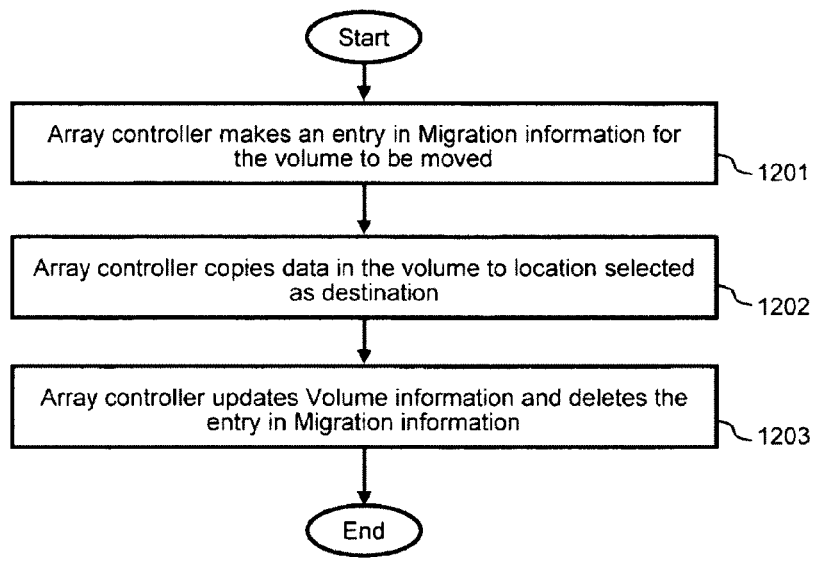

| Volume ID | Destination | | | Copy pointer (LBA) |
|---|---|---|---|---|
| | Parity Group | Start Address (LBA) | Capacity (MB) | |
| 2 | 1-2 | 0 | 102400 | 2000 |
| 3 | 2-2 | 419430400 | 204800 | 102400 |
| ⋮ | | | ⋮ | ⋮ |

FIG. 12 Migration Information

FIG. 14 Additional Area Information

FIG. 17 Additional Heat Information

| Node ID | Volume ID | Capacity (MB) |
|---|---|---|
| 1-1 | 2 | 102400 |
| | 4 | 307200 |
| | 9 | 204800 |
| | : | : |
| | Unused | 3072000 |
| 1-2 | 1 | 204800 |
| | 3 | 204800 |
| | 7 | 102400 |
| | : | : |
| | Unused | 4096000 |
| : | : | : |

FIG. 19 Volume Information

| Area Name | Condition | Node ID |
|---|---|---|
| Low | T < A | 1-1, 1-3, 1-5, ...<br>2-2, 2-4, 2-6, ...<br>3-1, 3-3, 3-5, ...<br>... |
| High | A =< T | 1-2, 1-4, 1-6, ...<br>2-1, 2-3, 2-5, ...<br>3-2, 3-4, 3-6, ...<br>... |

FIG. 21 Area Information

FIG. 23 Area Information

| Section | Equipment |
|---|---|
| 1-1 | Server #1 |
| | Server #2 |
| | Server #3 |
| 1-2 | Server #4 |
| | Server #5 |
| | Server #6 |
| : | : |
| 2-1 | Server #7 |
| | Server #8 |
| | Server #9 |
| : | : |

Configuration Information

FIG. 46 Area Information

FIG. 47 Heat Information

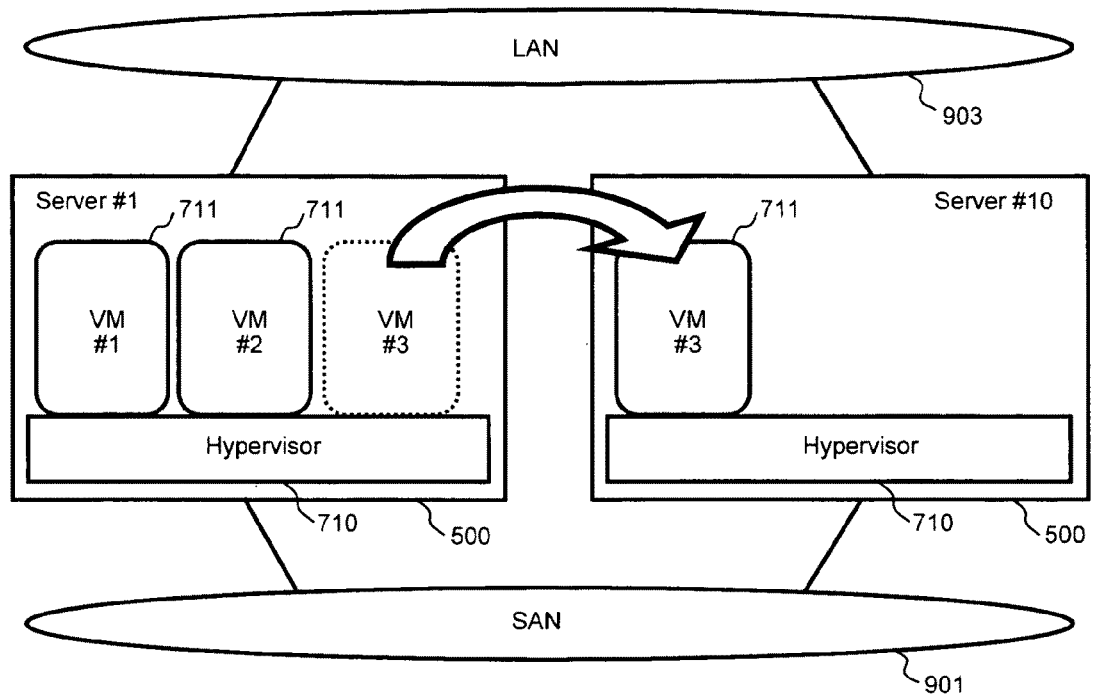
FIG. 32 Load Management by Re-Location of VMs
FIG. 33 Move Item Information

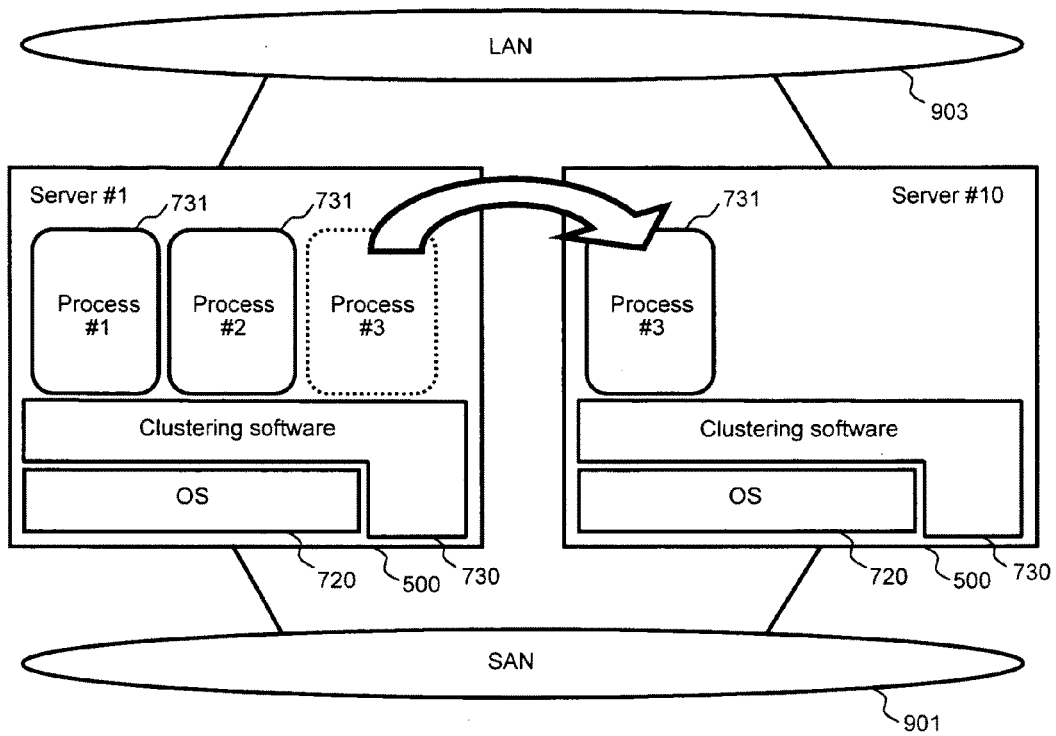
FIG. 34 Load Management by Re-Location of Processes
FIG. 35 Move Item Information

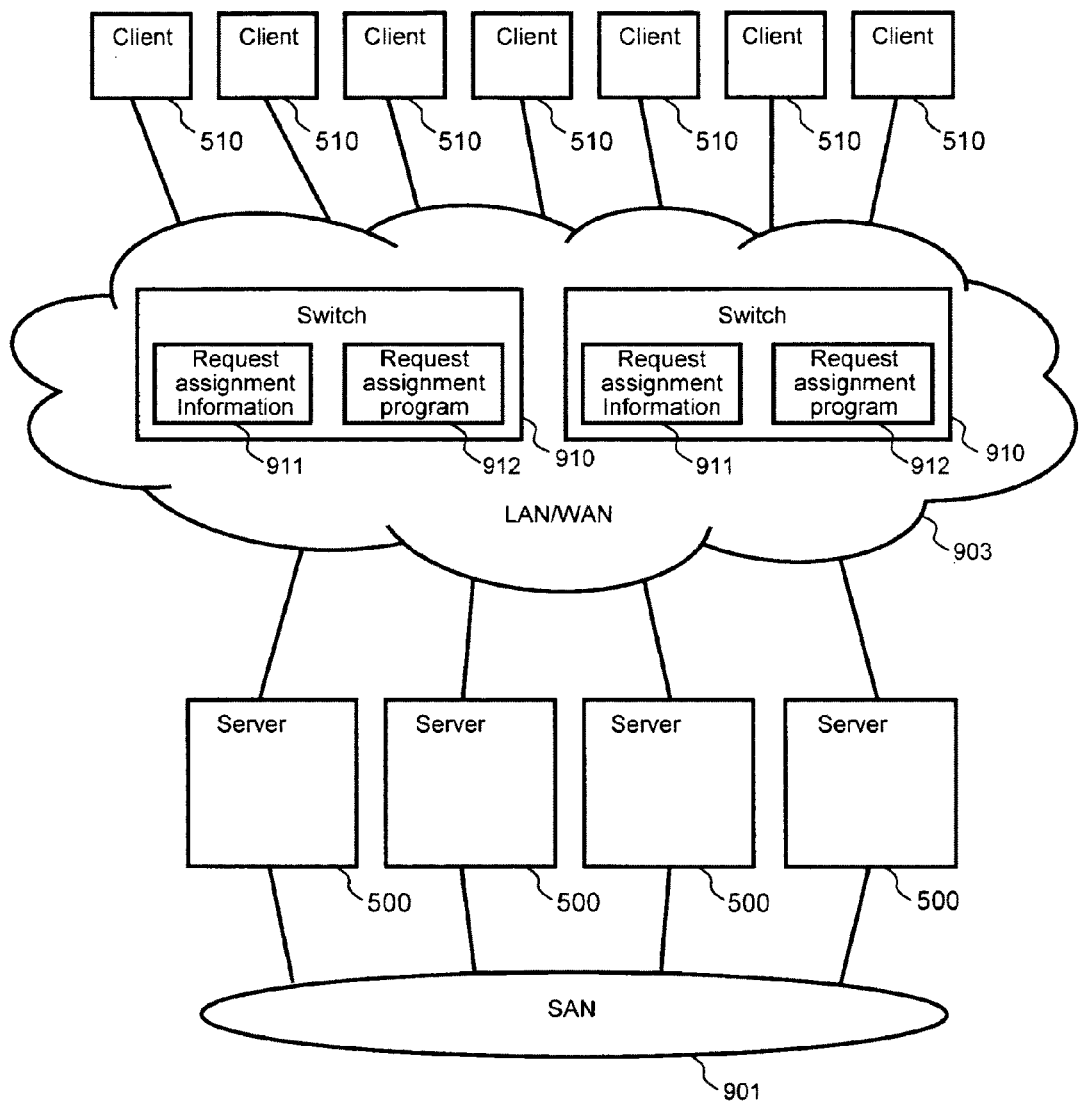
FIG. 36 Load Management through Switch Management

| Server ID (9111) | Request Assignment Rate (%) (9112) |
|---|---|
| 1 | 0.4 |
| 2 | 1.7 |
| 3 | 0.1 |
| : | : |
| Total | 100 |

FIG. 37 Request Assignment Information (911, 536)

| Server ID (9121) | Bandwidth (Mbps) (9122) |
|---|---|
| 1 | 2000 |
| 2 | 1000 |
| 3 | 500 |
| : | : |

FIG. 38 Request Assignment Information (911', 536')

| Item ID (5321) | Load Type (5322) | Load (5323) | | | |
|---|---|---|---|---|---|
| | | 6/25/2007 7:00am~ 8:00am | 6/25/2007 8:00am~ 9:00am | 6/25/2007 9:00am~ 10:00am | ... |
| VM1 | CPU usage (%) | 3 | 5 | 4 | ... |
| | Memory usage (MB) | 500 | 517 | 520 | ... |
| | Transaction rate (/s) | 300 | 360 | 340 | ... |
| | Transfer rate (MB/s) | 12 | 15 | 14 | ... |
| VM2 | CPU usage (%) | 0.2 | 0.25 | 0.33 | ... |
| | Memory usage (MB) | 302 | 380 | 380 | ... |
| | Transaction rate (/s) | 50 | 50 | 52 | ... |
| | Transfer rate (MB/s) | 2 | 2 | 2.5 | ... |
| : | : | : | : | : | ... |

FIG. 39 Load Information (532)

| Section | Equipment |
|---|---|
| 1-1 | Server #1 |
|  | Switch #1 |
|  | Server #2 |
| 1-2 | Server #3 |
|  | Storage #1 |
|  | Storage #2 |
| ⋮ | ⋮ |
| 2-1 | Server #4 |
|  | Switch #2 |
|  | Storage #3 |
| ⋮ | ⋮ |

Configuration Information

METHODS AND APPARATUSES FOR HEAT MANAGEMENT IN INFORMATION SYSTEMS

CROSS REFERENCES TO RELATED APPLICATIONS

This application is a continuation-in-part application of U.S. patent application Ser. No. 11/898,948, filed Sep. 18, 2007 now U.S. Pat. No. 7,818,499, the entire disclosure of which is incorporated herein by reference.

BACKGROUND OF THE INVENTION

1. Field of the Invention

The present invention relates generally to information systems such as data processing, communication and storage systems.

2. Description of Related Art

A number of factors are significantly increasing the cost of operating data centers and other information facilities. These factors include constantly increasing demands for additional data storage capacity, increasing demand for processing capacity, rising energy prices, and computers and storage systems that are consuming more electricity and requiring greater cooling capacity. Consequently, there has been a rapid growth in the density and power consumption of equipment at data centers and other information systems. To attempt to deal with these factors, a patchwork of solutions has been adopted. For example, some businesses try to pack equipment more densely into a single area to better use available floor space, while others try to spread out the equipment to reduce overheating problems. Nevertheless, if current trends continue, many information systems will soon have insufficient power and cooling capacity to meet their needs due to the increasing density of equipment and rapid growth in the scale of the systems.

Maintaining an appropriate temperature in computer equipment in high-density data storage and processing environments is needed to avoid failure of this equipment. Because air conditioning and circulation to cool equipment accounts for approximately one half of the electric power consumed in a typical information system, one solution for decreasing electricity consumption is through better management of the heat generated by the equipment and through more efficient cooling of the equipment in the information system.

Moreover, major equipment in information systems now have a capability that includes controlling power consumption based on the load on the equipment. For example, when a processer processes a program requiring a high processing load (i.e., a high load), the processer may consume a large amount of power. However, when the processer has almost no processing load (i.e., a low load) the processer is able to reduce power consumption by shifting to an idle mode that includes slowing down its clock speed (operating frequency). Thus, some equipment, such as servers and other components in an information system, are able to control power consumption according to the load for each component.

Related art includes U.S. Pat. No. 6,987,673, to French et al., entitled "Techniques for Cooling a Set of Circuit Boards within a Rack Mount Cabinet", the entire disclosure of which is incorporated herein by reference. However, the prior art does not disclose technology for managing and controlling locations of heat sources in information systems. The management and control of the amount of heat generated at specific locations in an information system can aid in achieving more efficient cooling, and thereby reduce the amount of electricity consumed. Thus, there is a need for better methods of managing and controlling heat distribution in facilities having a high density of equipment.

BRIEF SUMMARY OF THE INVENTION

In some embodiments, the invention provides methods and apparatuses for heat management of information processing equipment located in information systems including, but not limited to data centers and other types of facilities. In some embodiments, in order to realize efficient cooling, rules may be specified for the system according to the design of the system and according to the arrangement of equipment and cooling systems in the systems. In some embodiments, when the system detects a heat distribution that varies from a rule, the system is able to adjust the heat distribution, thereby achieving more efficient cooling and power consumption. These and other features and advantages of the present invention will become apparent to those of ordinary skill in the art in view of the following detailed description of the preferred embodiments.

BRIEF DESCRIPTION OF THE DRAWINGS

The accompanying drawings, in conjunction with the general description given above, and the detailed description of the preferred embodiments given below, serve to illustrate and explain the principles of the preferred embodiments of the best mode of the invention presently contemplated.

FIG. 3 illustrates an exemplary data structure of parity group information.

FIG. 4 illustrates an exemplary data structure of access information.

FIG. 5 illustrates an exemplary data structure of volume information.

FIG. 7 illustrates an exemplary data structure of area information.

FIG. 9 illustrates an exemplary data structure of heat information.

FIG. 11 illustrates an exemplary process for volume migration.

FIG. 12 illustrates an exemplary data structure of migration information.

FIG. 14 illustrates another exemplary data structure for area information.

FIG. 19 illustrates an exemplary data structure of volume information in the second embodiment.

FIG. 21 illustrates an exemplary data-structure of area information in the second embodiment.

FIG. 23 illustrates another exemplary data structure of area information.

FIG. 32 illustrates a first exemplary method of relocating a load.

FIG. 33 illustrates an exemplary data structure of move item information with respect to FIG. 32.

FIG. 34 illustrates a second exemplary method of relocating a load.

FIG. 35 illustrates an exemplary data structure of move item information with respect to FIG. 34.

FIG. 36 illustrates a third exemplary method of relocating a load.

FIG. 37 illustrates an exemplary data structure of request assignment information.

FIG. 38 illustrates another exemplary data structure of request assignment information.

FIG. 39 illustrates an exemplary data structure of load information in the fourth and fifth embodiments.

FIG. 46 illustrates an exemplary data structure of area information fourth and fifth embodiments.

FIG. 47 illustrates an exemplary data structure of heat information in the fourth and fifth embodiments.

DETAILED DESCRIPTION OF THE INVENTION

Figure 1:
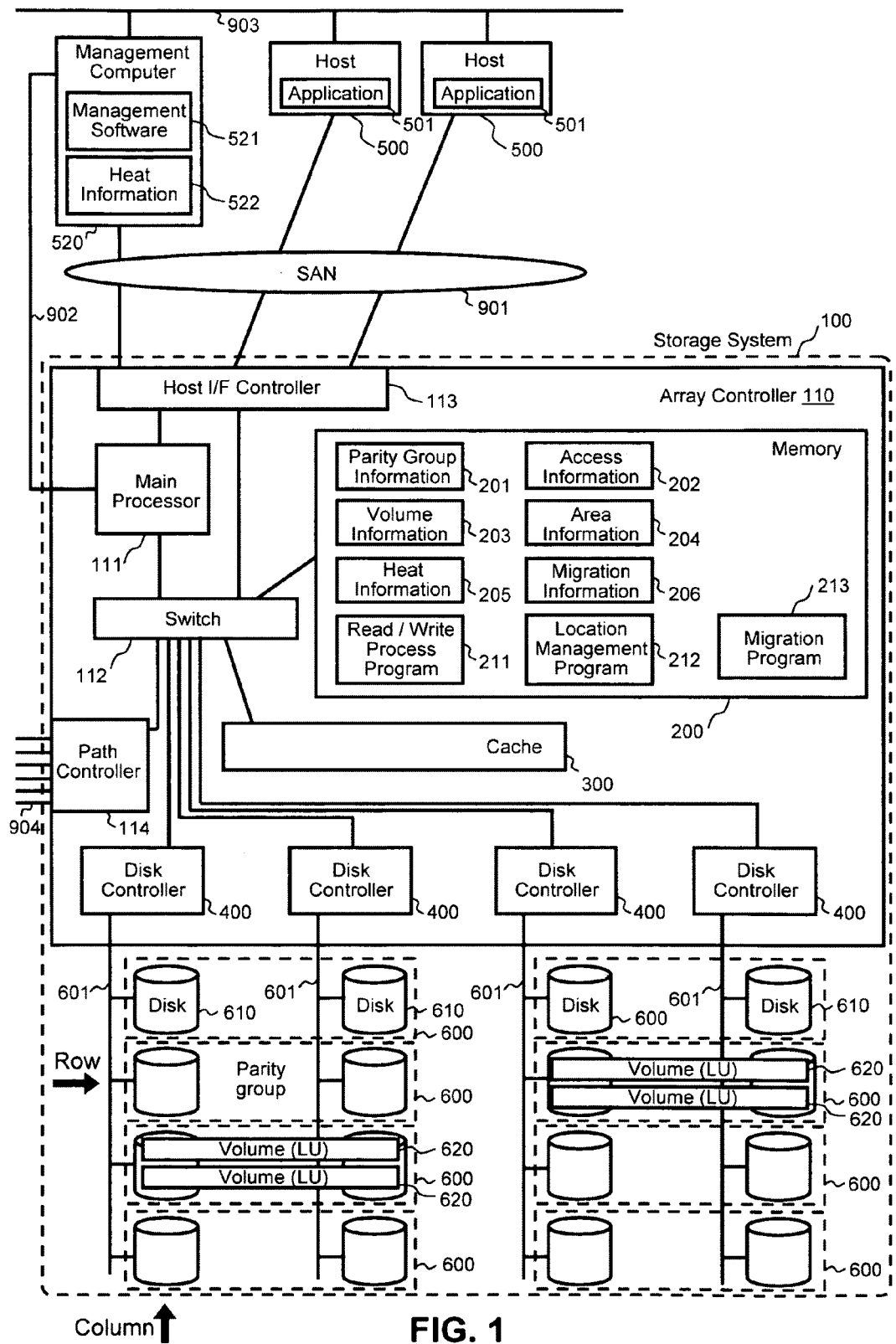
FIG. 1 illustrates an example of a system configuration in which the method and apparatus of the invention may be applied.

In the following detailed description of the invention, reference is made to the accompanying drawings which form a part of the disclosure, and, in which are shown by way of illustration, and not of limitation, specific embodiments by which the invention may be practiced. In the drawings, like numerals describe substantially similar components throughout the several views. Further, it should be noted that, while the detailed description provides various embodiments, as described below and as illustrated in the drawings, the present invention is not limited to the embodiments described and illustrated herein, but can extend to other embodiments, as would be known or as would become known to those skilled in the art. Additionally, the drawings, the foregoing discussion, and following description are exemplary and explanatory only, and are not intended to limit the scope of the invention or this application in any manner.

Embodiments of the invention disclose an information system that includes one or more host computers, a management computer and one or more storage systems having a heat measurement means, a volume migration means and a volume location management means. For example, a hard disk drive (HDD) that has a high access frequency generates more heat in a storage system in comparison with a HDD that has a low access frequency because the former requires continuous running of the motors for the spindle and head arms, while the latter can stop or slow down. Thus, embodiments of the invention establish rules for heat distribution in the storage system based upon access frequency or other data configuration and distribution metrics. In order to realize efficient cooling, a user or manager of an information systems facility can specify one or more rules according to the design of the facility and the arrangement of equipment and cooling systems in the facility.

For example, under some embodiments, when the system detects a heat distribution in the system that varies from the rule, the system is able to automatically adjust the heat distribution by changing the physical location of volumes in the system, thereby increasing the cooling efficiency and reducing power consumption. Furthermore, in some embodiments the management of heat distribution is performed among multiple storage systems (nodes). The user or the manager can specify a rule of heat distribution for multiple storage systems in the same facility. When one of the storage systems detects a variation of heat distribution from the rule, the storage system can adjust the heat distribution by changing the physical location of volumes within the multiple storage systems, which enables optimization of heat distribution through out the facility, based on one or more rules. Additionally, some embodiments of the invention include a process for managing allocation of a new volume for achieving better heat distribution management.

In yet other embodiments, the management of heat distribution is performed among multiple computers. The user or the manager can specify a rule of heat distribution for the system including computers in the information system. When a management computer detects a shift of heat distribution outside the rule, the management computer can send instructions to attempt to adjust the heat distribution, such as by changing a physical location of a load among the computers. By the above method, the optimization of heat distribution based on a specified rule can be performed for computers, such as servers or other types of hosts.

In yet other embodiments, the management of heat distribution is performed in an information system including computers, storage systems and network switches. The user or the manager can specify a rule of heat distribution for the entire information system. When the management computer detects a shift of heat distribution away from the rule, the system can adjust the heat distribution by changing a physical location of the loads on the equipment, such as processing loads of the computers, I/O loads on the storage systems and transaction loads on the switches in the system. By the above method, the optimization of heat distribution based on a specified rule can be performed for the entire information system.

First Embodiments

System Configuration

FIG. 1 illustrates an information system configuration in which first embodiments of the invention may be applied. The information system of FIG. 1 includes one or more storage systems 100 in communication with one or more host computers 500 and a management computer 520. Storage system 100 includes an array controller 110 for controlling access and storage of data to a plurality of storage devices, which are hard disk drives (HDDs) 610 in the preferred embodiment. However, in other embodiments, the storage devices may also be solid state devices, optical devices, or the like. Array controller 110 includes a main processor 111, a switch 112, a host interface 113, a path controller 114, a memory 200, a cache 300, and one or more disk controllers 400 for communicating with disk drives 610 via a backend path 601. Backend path 601 may utilize SCSI on Fibre Channel, SATA, SAS, iSCSI, or the like.

Main processor 111 performs various processes on the array controller 110, such as processing input/output (I/O) operations received from host computers 500, storing data to and retrieving data from storage devices 610, and other storage system management functions. Main processor 111 and other components of storage system 100 use a plurality of programs and data structures for carrying out embodiments of the invention, which may be stored in memory 200 or other computer readable medium. The data structures include parity group information 201, access information 202, volume information 203, area information 204, heat information 205, and migration information 206, each of which is described further below. Main processor 111 performs the processes of the invention by executing one or more programs stored in memory 200 or other computer readable medium, and which include a read/write process program 211, a location management program 212, and a migration program 213, each of which is described further below.

Hosts 500 and management computer 520 are connected for communication with host interface 113 via a storage area network (SAN) 901, which may be Fibre Channel, iSCSI(IP), or other network type. Hosts 500 and management computer 520 are connected for communication with each other via a local area network (LAN) and/or wide area network (WAN) 903, which may be Ethernet or other network type. Management terminal 520 may also be connected to array controller 110 via an out-of-band (management) network 902, which may be Internet Protocol or other network type, and which may be the same as LAN 903, or a separate network. Storage system may also have a path controller 114 to be connected by a node network 904 explained in the second embodiment. To have capability as computers, hosts 500 and management computer 520 each have typical computing resources, such as a processor and a memory (not shown in FIG. 1). Each host 500 may include application software 501 for sending I/O requests to storage system 100, and may also include operating system software, a file system, and the like (not shown). In addition, management computer 520 includes management software 521, and may also include heat information 522, which are described further below.

A plurality of logical volumes 620 (logical units) may be provided by storage system 100 as storage resources, such as for use by hosts 500 for storing application data, or the like. Volumes 620 are created from a collection of physical storage areas in HDDs 610. Volumes 620 may be protected by storing parity code, i.e., by using a RAID (Redundant Array of Independent Disks) configuration for volumes formed over a collection of multiple disk drives 610. Such a collection of disk drives 610 in a RAID configuration that can be used to provide one or more volumes is referred to as an array group or parity group 600. In the embodiments of the invention, various parity group configurations (RAID configurations) and various numbers of disks in each parity group can be applied depending on administrative preferences, intended use of the storage system, and the like. A host 500 is able to store data in one or more of volumes 620, and utilize the data in the volume. In other words, host 500 is able to write data to a volume 620 and read data from the volume 620 for running the application 501 on host 500.

Figure 2:
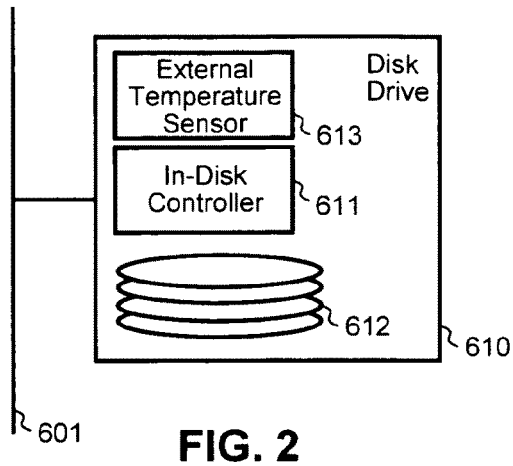
FIG. 2 illustrates an example of a storage device configuration of the invention that may be used in the architecture of FIG. 1.

As illustrated in FIG. 2, one or more of disk drives 610 according to embodiments of the invention may include an external temperature sensor 613 in addition to an in-disk controller 611, and magnetic storage media 612. For example, according to some embodiments, one disk drive in each parity group may be equipped with external temperature sensor 613. In-disk controller 611 processes read and write requests received from disk controller 400 and transfers data from or stores data to magnetic media 612 according to the read and write requests, respectively. Moreover, in-disk controller 611 obtains information regarding the temperature in the vicinity of disk drive 610 from the external temperature sensor 613, and sends this temperature information to array controller 110. As another example of a configuration, the temperature sensor 613 may be located on other equipment close to a parity group, for example within a parity group enclosure or other location within storage system 100, and transmit the temperature information to the array controller 110 regarding the temperature of a particular parity group or other disk, disk group, individual storage cabinet, or the like, within the storage system.

Array controller 110 manages parity groups 600 within storage system 100 by referring to parity group information 201. FIG. 3 illustrates an example of a data structure of parity group information 201. As illustrated in FIG. 3, parity group information 201 may include a parity group identifier (ID) 2011, a number of disks 2012 in each parity group 600, a type of disk configuration (RAID type) 2013, a disk ID 2014 for identifying individual disks in each parity group 600 and a capacity 2015 of each disk.

In order to provide volumes to each host 500, array controller 110 maintains access information 202 and volume information 203. Array controller 110 receives an I/O operation, such as a read or write command, from host 500 via SAN 901 and reads data from or stores data in a volume targeted by the command. In addition, array controller 110 records and maintains an amount of read and write accesses (i.e., the access load) in access information 202.

FIG. 4 illustrates an example of a data structure of access information 202. Access information 202 includes a volume ID 2021, a load measurement type 2022 and an access load 2023 measured for the volume according to one or more of the load measurement types. For example, in FIG. 4, the access load for each volume is expressed by average number of accesses and amount of data transferred per unit time. Namely, average I/O operations per second (iops) and average MB transferred per second (MB/s) over the course of an hour may be recorded for each volume in access information 202.

FIG. 5 illustrates an example a data structure of volume information 203. As illustrated in FIG. 5, volume information 203 includes a parity group ID 2031 that identifies in which parity group the volume is formed, a volume ID 2032, a start logical block address (LBA) 2033 and a capacity 2034 allocated for the volume. Volume information 203 maintains a mapping between each volume and a physical region of the volume in one of parity groups 600. Volume information 203 also maintains information about unused regions of each parity group 600. Array controller 110 is able to search for a volume or an unused region by using volume information 203.

Figure 6:
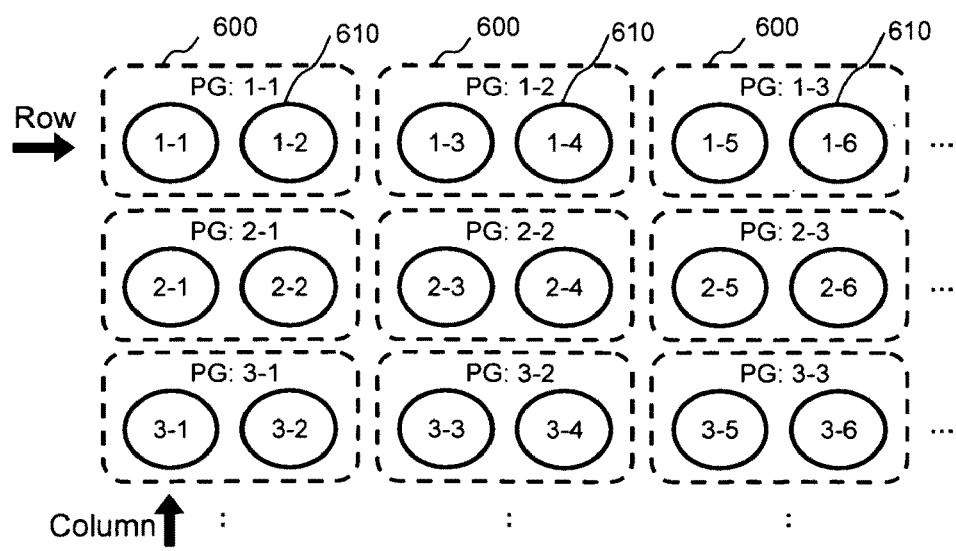
FIG. 6 illustrates an exemplary physical configuration of a parity group.

In some embodiments of the invention, the physical location of each parity group 600 in storage system 100 can be specified according to "row" and "column". FIG. 6 illustrates an example of a physical configuration of parity groups 600 showing their locations relative to each other. FIG. 6 also illustrates the relation between a physical location of each parity group 600 and the row/column (i.e., row and column location). For example, a row of parity group 1-2 is "row 1", and the column of parity group 1-2 is "column 2".

Array controller 110 can implement a rule for heat distribution among all parity groups 600 by using area information 204. FIG. 7 illustrates an example of a data structure for area information 204. In the embodiment of FIG. 7, parity groups 600 are divided into one of two areas (i.e., "High" or "Low"), as entered in area name field 2041. Regarding a condition 2042 in area information 204, "T" indicates a target temperature of each parity group 204 and "A" indicates a boundary of the temperature determined from average temperature of all parity groups 600. Array controller 110 can determine (i.e., calculate) the average temperature "A" used as a boundary by referring to heat information 205 described below that is collected for each of the parity groups, and then determine the average temperature for all the parity groups. The rule of FIGS. 7 and 8A-8B enables half of the parity groups to be above the average temperature and half below, thereby normalizing the temperatures of all the parity groups. Parity group ID 2043 in the area information 204 indicates the parity group 600 belonging to each area 2041.

Figure 8A:
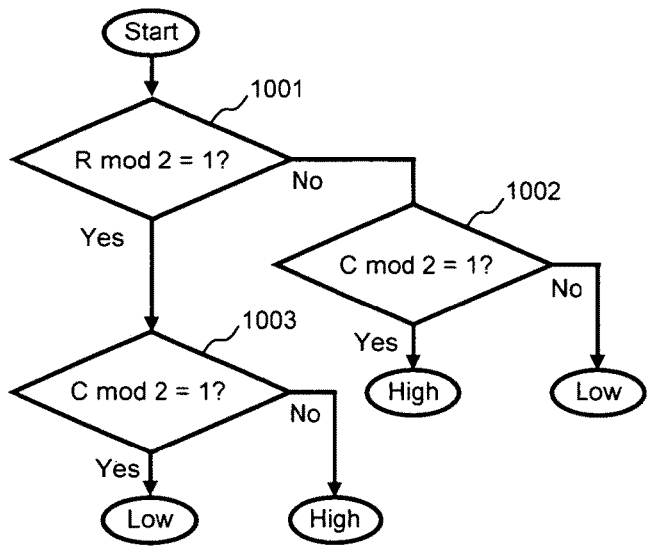
FIGS. 8A-8B illustrate an exemplary process for applying a rule to parity groups and the resulting heat distribution configuration.
Figure 8B:
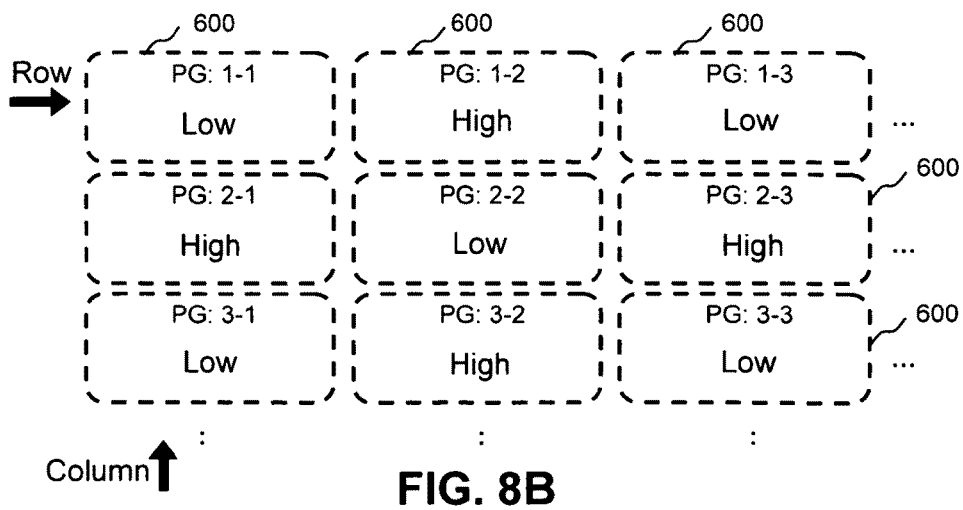

In this example, the area that each parity group 600 belongs to is determined by a rule, the process of which is illustrated in FIG. 8A. In FIG. 8A, "R" means the row of the parity group 600 and "C" means column of the parity group 600. As illustrated in FIG. 7 and FIGS. 8A-8B, in this example, arrangement of "High" parity groups 600 and "Low" parity groups 600 are equalized or homogenized. As discussed later, this achieves equalization of the heat distribution (i.e., temperature) within the storage system. For example, step 1001 determines whether row mod 2=1. The process then goes to either step 1002 or step 1003 to determine if the column mod 2=1. The result is that a YES, YES answer or a NO, NO answer means that the parity group is classified as a "Low" temperature area, while a YES, NO answer or a NO, YES answer means that the parity group is classified as a "High" temperature area.

In the particular example illustrated in FIGS. 7 and 8A-8B, the rule results in a checker board pattern as illustrated in FIG. 8B, in which "Low" temperature areas are bounded by "High" temperature areas, and vice versa. In other rules or system arrangements, other patterns may be more efficient, such as having "High" areas on the outside locations and "Low" areas in the center locations. For a cooled environment like a data center or other facility using a general air-cooling method, uneven distribution of heat causes inefficiency because over-cooling in one or more portions of the overall area is necessary in order to keep the hottest areas at a certain minimum temperature. On the other hand, by the arrangement illustrated in FIG. 8B in which each high temperature parity group is bounded by low temperature parity groups, and vice versa, the heat distribution is equalized across the storage devices making up the parity groups. Equalization of heat distribution across all the components avoids the inefficiency mentioned above, and achieves more efficient cooling since the overall cooling load is decreased. This also avoids localized failures of one or more of disk drives 600 due to a localized high temperature. Furthermore, as an alternative method, the boundary temperature "A" may be specified by a user from management computer 520 rather than being calculated by array controller 110.

Monitoring of Temperature

As discussed above, array controller 110 collects temperature information of each disk drive 600 or parity group 600. Array controller 110 records and maintains the temperature information in heat information 205. FIG. 9 illustrates an example of a data structure of heat information 205. As illustrated in FIG. 9, array controller 110 records the temperature of each parity group 600 at predetermined time intervals by gathering or receiving input from temperature sensors 613. A user can specify the interval time for collecting the temperature information via management computer 520. Array controller 110 may acquire temperature of a parity group 600 by taking the average of temperature of disk drives 610 that belong to the parity group 600, or a single temperature sensor 613 may be allocated to each parity group, or the like. Heat information 205 may be transferred to management computer 520 and displayed to a user as heat information 522 in order to facilitate or enable some user decisions.

Process for Maintaining Proper Distribution of Heat

Figure 10:
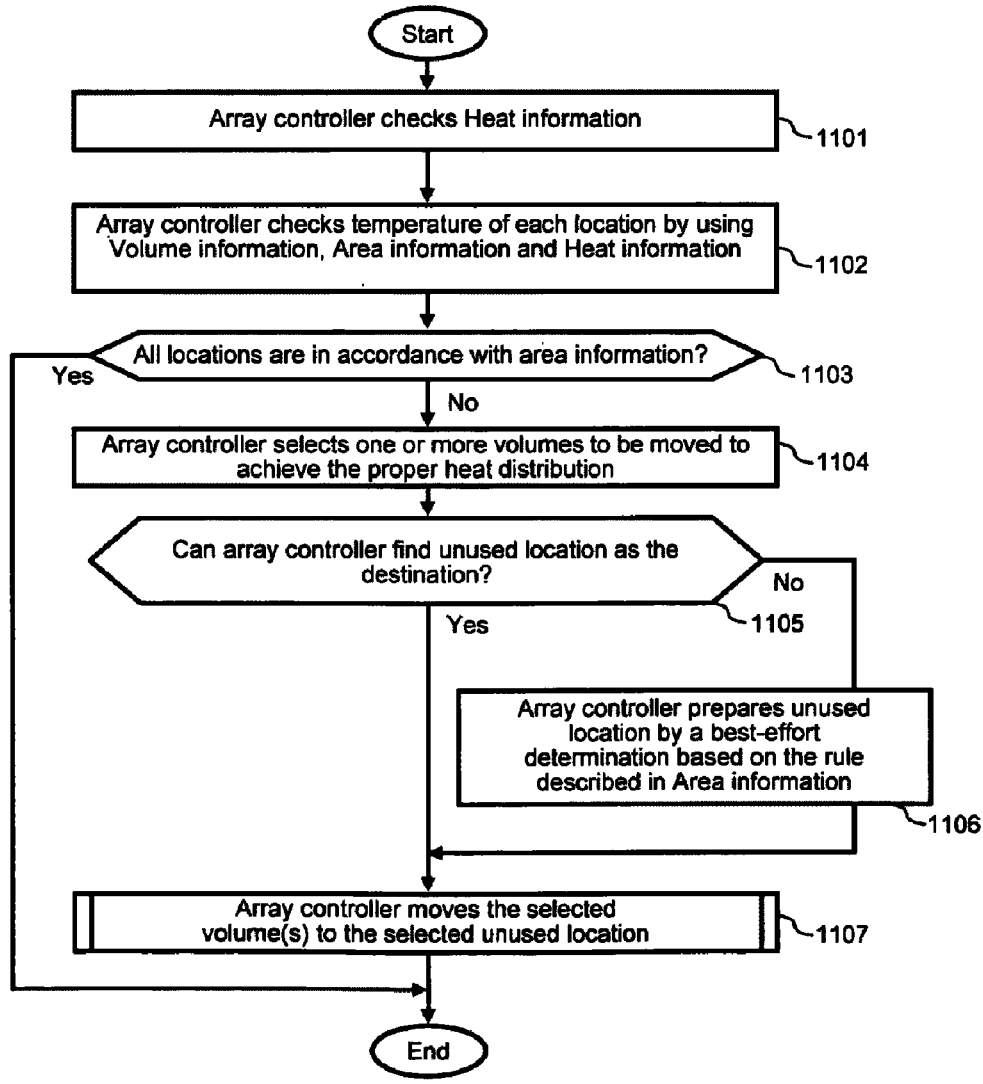
FIG. 10 illustrates an exemplary process carried out for achieving efficient heat distribution.

FIG. 10 illustrates an exemplary process for maintaining a desirable heat distribution in the storage system 100. By following the process described in FIG. 10, storage system 100 can achieve proper heat distribution according to the rule defined by area information 204, so that hot spots are avoided.

At step 1101, array controller 110 checks heat information 205 at a predetermined periodic interval, or in response to an alarm if one of temperature sensors 613 indicates a temperature above a predetermined temperature.

At step 1102, array controller 110 checks the temperature of each parity group 600 by using volume information 203, area information 204 and heat information 205. Array controller 110 verifies whether the condition described in area information 204 is preserved or not.

At step 1103, if the heat distribution based on the condition is maintained in accordance with the area information 204, then the process ends. If not, then the process goes to step 1104 to take corrective action.

At step 1104, array controller 110 selects one or more volumes to be moved to achieve the proper heat distribution. The details of this step are discussed further below.

At step 1105, array controller 110 seeks unused location as destinations for the volume(s) need to be moved to satisfy the condition. If array controller 110 is able to find unused locations that meet the requirements, the process proceeds to step 1107. On the other hand, if there are no unused locations that meet all the requirements, the process goes to step 1106.

At step 1106, array controller 110 selects an unused location as a destination of the volume by a best-effort determination based on the category described in area information 204. As one example of the best-effort determination, array controller 110 may select an unused location that can bring the heat distribution closer to the condition even if the condition is not satisfied. As another example, array controller 110 may decide not to perform any change (i.e. no operation) if there will be only minimal improvement.

At step 1107, array controller 110 moves the selected volume(s) to the selected unused location(s), and the process ends. The details of the migration process are described below.

At step 1104, when array controller 110 finds a "Low" parity group 600 (i.e., a parity group belonging to the "Low" area according to area information 204) that has a higher temperature than the condition specified for "Low" (i.e., "T" is not less than "A"), the array controller 110 selects the volume having the largest load in that parity group 600 by referring to access information 202. Then, at step 1105, array controller 110 selects an unused location in one of the "High" parity groups 600 (i.e., a parity group classified as being in the "High" area) as a target destination for migration of the volume. By moving the volume having the highest load (i.e., a generator of a large amount of heat due to a large amount of I/O operations) to a "High" parity group 600, the heat at the "Low" parity group is reduced, and instead the volume is located at a parity group that is allowed to have higher heat according to the heat distribution pattern established by the rule of FIGS. 7 and 8. Alternatively, instead of moving to the unused location, array controller 110 may swap the volume at the "Low" parity group with a volume having a low load in one of "High" parity groups 600 if the array controller 110 can find a volume having the same size (allocated capacity).

At step 1104, when array controller 110 finds a "High" parity group 600 (i.e., a parity group belonging to the "High" area according to area information 204) that has a lower temperature than the condition of "High", the array controller 110 may be configured to select the volume having the smallest load in the parity group 600 by referring to access information 202. Then, at step 1105, array controller 110 selects an unused location in one of the "Low" parity groups 600 (i.e., belonging to "Low" area according to area information 204) as a target destination for migration. By moving the volume at step 1107, an unused location is created in the particular "High" parity group 600, which means that a volume of high load can be migrated to the unused location. Therefore, the heat distribution is automatically adjusted to the distribution set forth by the rule, as illustrated in FIGS. 7 and 8A-8B. Alternatively, instead of just moving the low use volume to the unused location in one of the "Low" parity groups, array controller 110 may automatically swap the low-use volume with a volume having a high load that is located in one of the "Low" parity groups 600 if the array controller 110 is able to find such a volume having the same size (allocated capacity).

Furthermore, with regard to the interval for carrying out the periodic check of the system at step 1101, a user can specify the interval from management computer 520, or change the interval as desired. With the above process, the management of heat distribution within storage system 100 according to the specified rule is achieved. As an alternative method, other units of area may be used instead of parity groups 600, and a large number of such variations are possible, depending on the location of disk drives within the storage system, and methods of volume creation, and the like. Moreover, as another alternative method, management software 521 may manage and instruct the adjustment of the locations of volumes by having the information mentioned above, and also by taking into account other factors, such as available capacity in each parity group, desired performance for particular volumes, and the like. Additionally, in some embodiments, instead of using parity groups, volumes might be formed on individual storage devices. In this case, one or more first storage devices might be designated as "high" temperature devices and one more second storage devices might be designated as "low" temperature devices. A heat distribution pattern and rule can be applied to such individual storage devices in the same manner as discussed above for parity groups.

Process of Volume Migration

FIG. 11 illustrates an exemplary process of for carrying out the volume migration described above in order to normalize the heat distribution in the storage system. In carrying out the process, array controller 110 uses migration information 206. FIG. 12 illustrates an example of a data structure of the migration information 206. Migration information 206 includes a volume ID 2061 of the volume to be moved, destination information 2062 regarding the unused location selected as destination and copy pointer (LBA) 2063 that denotes progress of copy. The destination information 2062 includes parity group 2064, the start address (LBA) 2065 of the volume, and the capacity 2066 of the volume.

At step 1201, array controller 110 makes an entry in migration information 206 for the volume to be moved, including volume ID 2061, parity group 2064 of the destination, start address 2065 of the destination, and capacity 2066.

At step 1202, array controller 110 begins copying the data in the volume to the location selected as the destination. As the copying of the data progresses, copy pointer 2063 in migration information 206 is updated and moved forward.

At step 1203, after completion of the copying of the data to the destination, array controller 110 updates volume information 203 to change mapping between the volume and the physical location to which the volume was migrated. This results in a migration of the volume that is transparent to the host 500. After the volume information has been update, array controller 110 deletes the entry of the original volume from the volume information 203.

Process for Read/Write Access to the Volume During Migration

Figure 13:
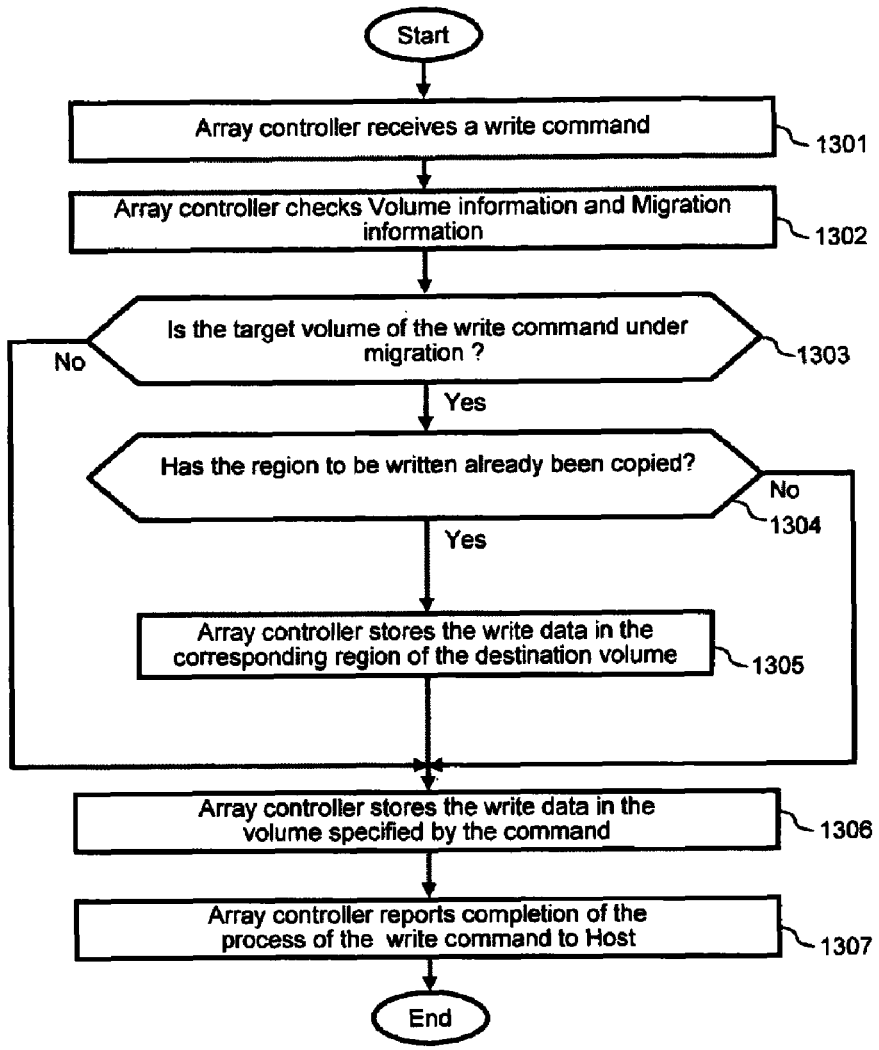
FIG. 13 illustrates an exemplary process for carrying out a write request to a volume under migration.

FIG. 13 illustrates an exemplary process for a write request carried out when the write request targets a volume that is being migrated.

At step 1301, array controller 110 receives a write operation from a host 500 via SAN 901.

At step 1302, array controller 110 refers to volume information 203 and migration information 206 to determine the volume mapping and to determine whether the volume is undergoing migration.

At step 1303, as a the result of referring to the volume ID 2061 recorded in migration information 206, array controller 110 can determine whether the volume that is the target of the write command is under migration, and, if so, the process proceeds to step 1304. On the other hand, if the target volume is not currently being migrated, the process goes to step 1306.

At step 1304, as a result of referring to the copy pointer 2063 in the migration information 206, array controller 110 can determine whether the targeted region to be written in the targeted volume has already copied as part of the migration process. If the targeted region of the volume has already been copied to the new area, the process goes to step 1305. If not, the process goes to step 1306.

At step 1305, array controller 110 stores the received write data in the corresponding region of the destination volume. The write data is transferred from host 500 via SAN 901, and may be stored in cache 300 temporarily before storing to the destination volume.

At step 1306, array controller 110 stores the write data in the volume specified by the command.

At step 1307, array controller 110 reports completion of the process of the write command to the host 500. Thus, by carrying out the above process, the write data is stored in the both the specified target volume and the destination volume when the write command specifies a portion of the volume that has already been copied in a migration process.

For a read operation received from a host 500, array controller 110 receives the read request from host 500 via SAN 901, and refers to volume information 203 to determine the physical location of the target portion of the volume. For example, if the volume information shows that the volume is in the original parity group, then the migration has not been completed, and the data can be read from the original location. On the other hand, if the migration has completed, then volume information has been changed, and the volume information will map to the volume, in the destination parity group. Array controller 110 obtains the data stored in the region specified in the read command, and transfers the data to the host 500 via SAN 901.

Additional Example of Area Information

Figure 15:
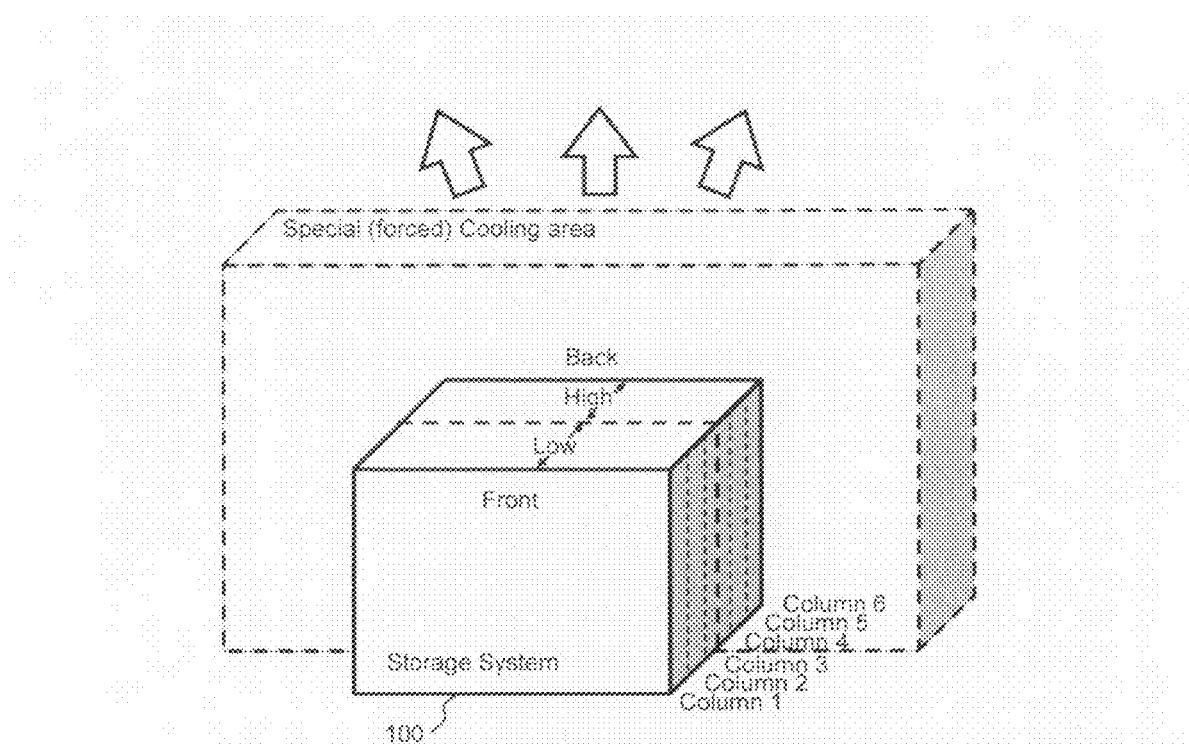
FIG. 15 illustrates an exemplary configuration for cooling of a storage system.
Figure 16:
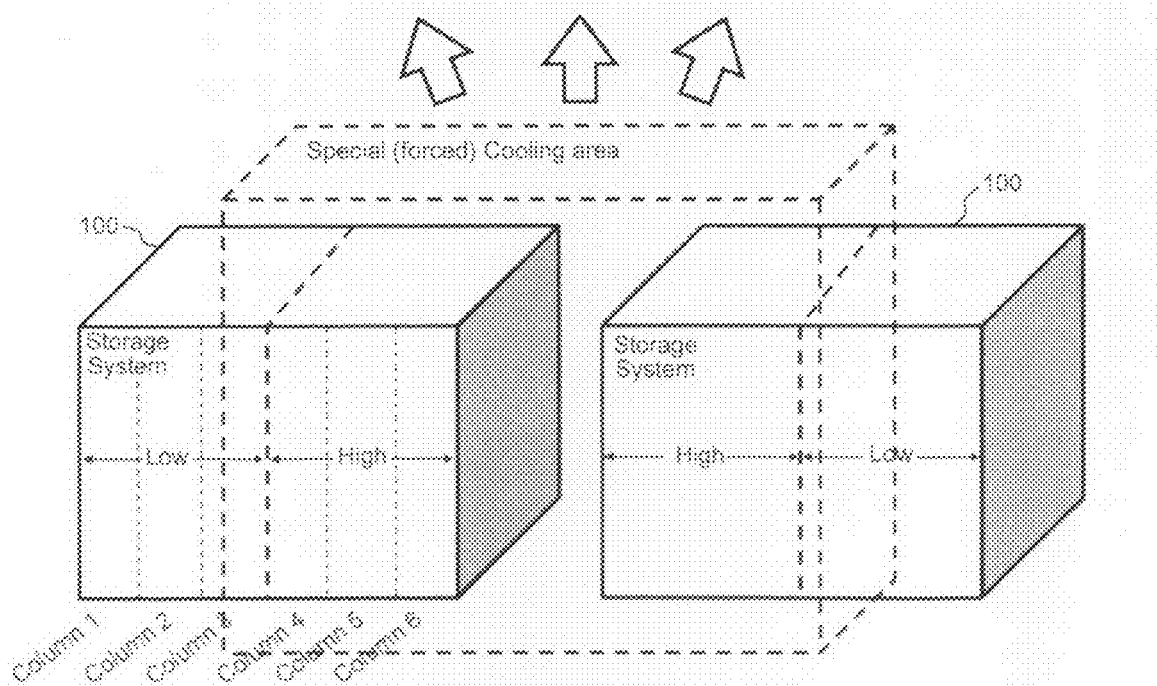
FIG. 16 illustrates an exemplary configuration for cooling of multiple storage systems.

FIG. 14 illustrates another example of a data structure of area information 204' according to another example of a rule of heat distribution. In FIG. 14, a series of columns belongs to "Low" parity groups 600 while another series of columns belongs to "High" parity groups 610. As illustrated in FIG. 15, this rule creates an intentional spatial localization of heat in which a portion of the parity groups are intended to generate a larger amount of heat than another portion of the parity groups. By directing concentrated cooling primarily at the parity groups intended to produce the most heat, this localization of heat production and concentrated cooling realizes a high efficiency of cooling with lower power consumption used for cooling. Additionally, FIG. 16 illustrates how the area information 204' of FIG. 14 can be applied to a plurality of storage systems 100 so that concentrated (forced) cooling air is directed through the parity groups designated for having a higher heat production, and not through the parity groups designated for having lower heat production, thereby achieving more efficient cooling of the entire system. Separation of areas of high temperature from areas of low temperature, such as isolation of a "hot aisle" and a "cool aisle" is one method to realize efficient cooling. The process mentioned above can be applied to achieve such separation.

Additional Example of Heat Information

Figure 17:
FIG. 17 illustrates another exemplary data structure of heat information.

FIG. 17 illustrates another example of heat information 205'. In this heat information 205', a type field 2053 is included that contains entries for the maximum (highest) temperature, the minimum (lowest) temperature, and the average temperature measured over a predetermined period, which are recorded and maintained, instead of just the instantaneous temperature, as described above with reference to FIG. 9. By using management computer 520, a user can choose the type of value to be used for the determination mentioned above in determining whether a particular parity group is in conformance to a specified rule for heat distribution.

Second Embodiment

System Configuration

Figure 18:
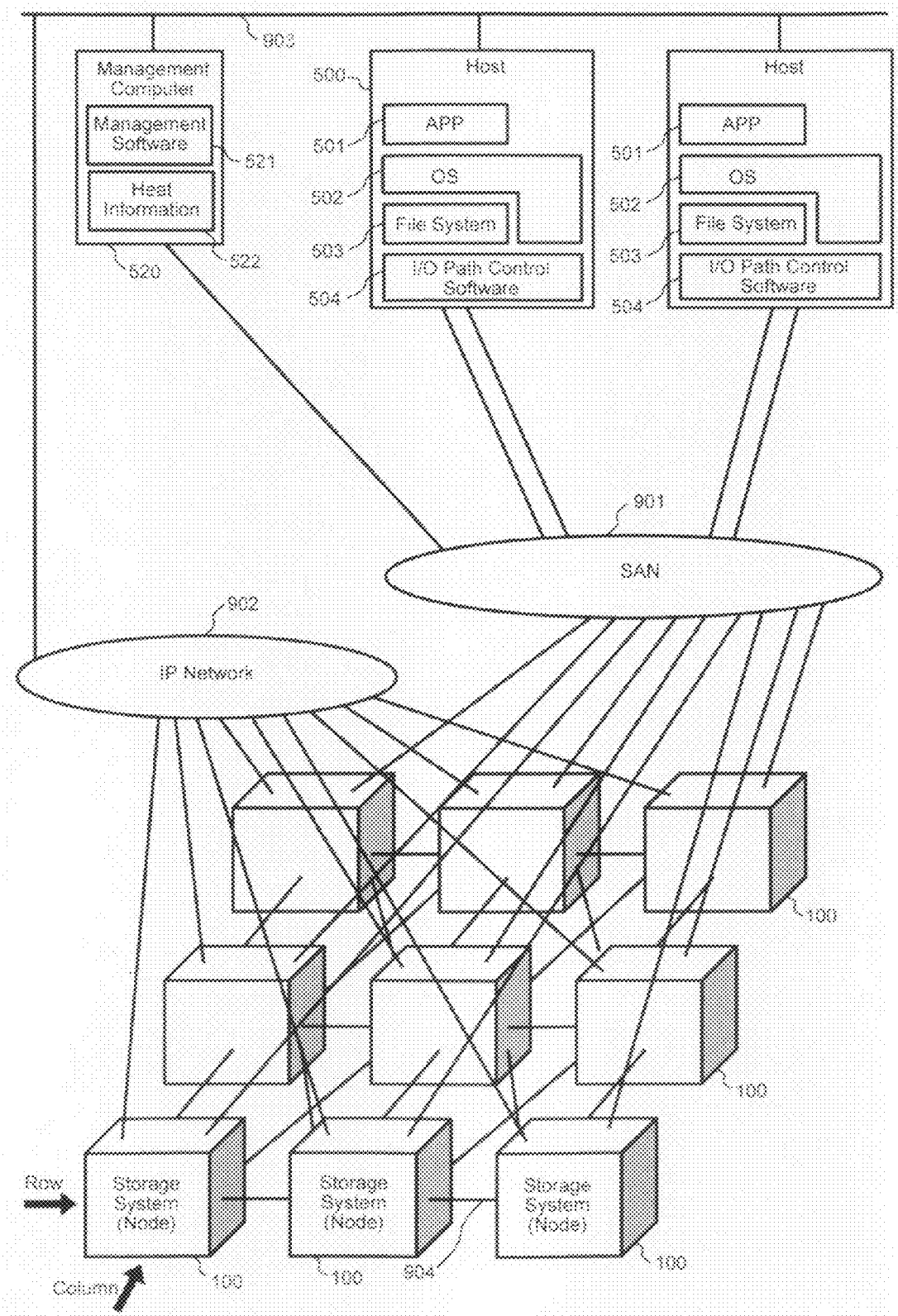
FIG. 18 illustrates an exemplary system configuration according to a second embodiment of the invention.

FIG. 18 illustrates an example of a system configuration in which second embodiments of the invention may be carried out. In the system configuration of FIG. 18, multiple storage systems 100 (also referred to as storage nodes) are connected for communication with each other via node network 904, which may be, for example, Fibre Channel, Internet Protocol, InfiniBand, or the like, and which is accessed through path controller 114 (see FIG. 1). Each of storage systems 100 can be configured to possess equivalent components, such as an array controller 110 (see FIG. 1) including data structures and programs discussed above for storage system 100 in the first embodiments, disk drives, and the like.

The storage systems 100 are also connected to hosts 500 and management computer 520 via SAN 901 (e.g., Fibre Channel, iSCSI(IP)) and by out-of-band network 902 (e.g., Internet Protocol) and/or LAN 903 as described above in the first embodiments. In addition to application software 501, operating system 502 and file system 503, each host 500 includes I/O path control software 504.

Array controllers 110 on each of the storage systems 100 are able to receive read and write commands from a host 500 via SAN 901 and retrieve or store data according to the commands. In addition, each array controller 110 records and maintains an amount (i.e., the load) of read and write accesses in access information 202, as described above with respect to FIG. 4, so that each node is aware of which volumes have the highest and lowest access loads. Also, temperature sensors 613, as discussed in reference to FIG. 2 in the first embodiments are located on one or more disk drives 610, on other equipment or in enclosures of each storage system 100, and are configured to transmit temperature information to each array controller 110 of each storage system 100.

FIG. 19 illustrates an example of a data structure of volume information 203' in this embodiment. FIG. 19 illustrates a relation between storage nodes 100 and volumes that are located in the node, rather than identifying volume according to parity group as in the first embodiments. Thus, volume information 203' includes an entry 2035 for node ID, in addition to volume ID 2032 and capacity 2034.

Figure 20:
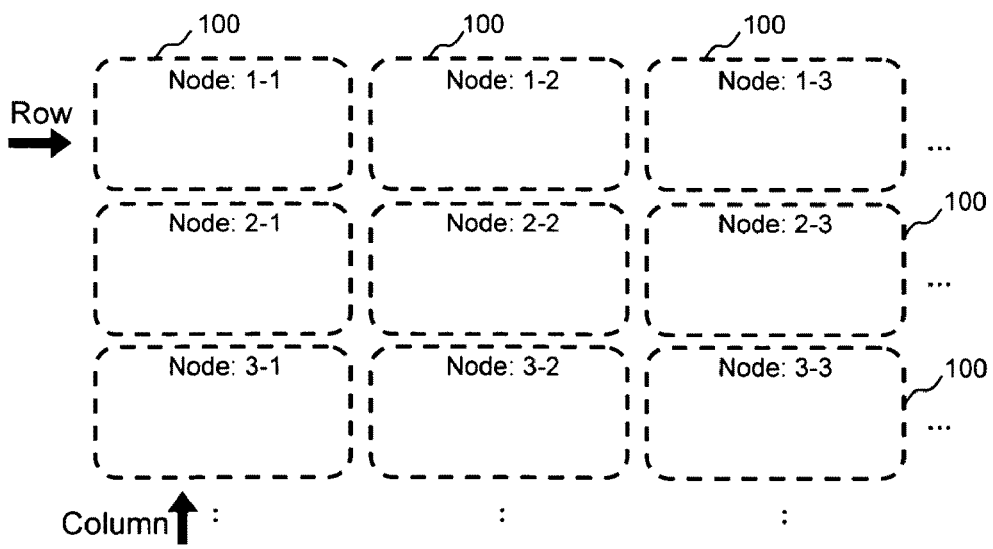
FIG. 20 illustrates an exemplary physical configuration of nodes in the second embodiment.

In this embodiment, a physical location of each storage system node 100 can be also specified by "row" and "column". FIG. 20 illustrates an example of a physical configuration (i.e., locations) of storage nodes. FIG. 20 also illustrates the relation between the physical location of each node and that node's row and column. For example, the row of Node 1-2 is row "1", and the column of Node 1-2 is column "2".

Area Information and Processes to Manage Distribution of Heat

At least one of the storage nodes 100 can have a rule for heat distribution among all the storage nodes 100 by using area information 204". For example, one node may be a management node configured to determine whether the heat distribution among the nodes 100 is in accordance with a specified rule. FIG. 21 illustrates an example of area information 204" that can be used in this embodiment, which includes a node ID entry 2044, in place of parity group entry 2043, according to assigned row and column. In FIG. 21, the storage nodes are divided into two areas, i.e., "High" and "Low" areas. Regarding condition 2042 in the area information 204", "T" indicates the target temperature of each node and "A" indicates the boundary of the temperature determined from the average temperature of all the storage nodes 100. One of array controllers 110 on one of nodes 100, such as a node designated as a management node, can determine (i.e., calculate) the boundary temperature "A" by referring to heat information 205 which is similar to that discussed above with respect to FIGS. 9 and 17, except that temperature information is collected per node instead of per parity group.

Figure 22:
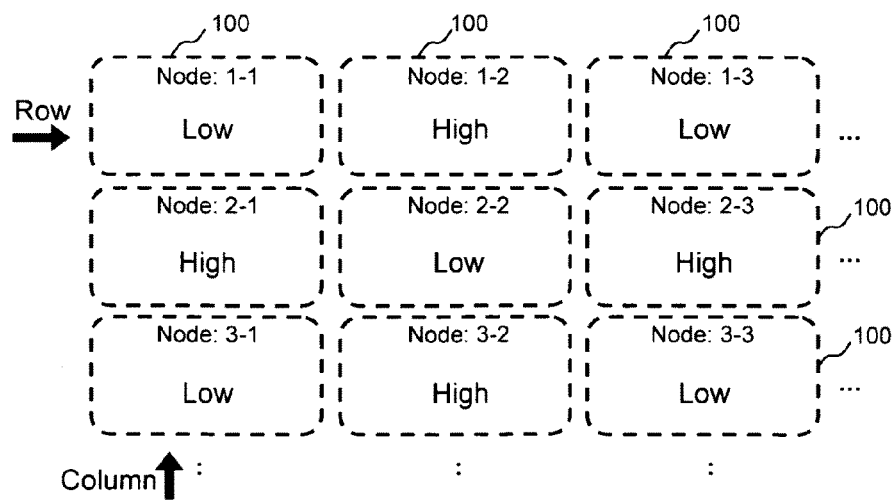
FIG. 22 illustrates the exemplary physical configuration of FIG. 20 in which the nodes are equalized.

As illustrated in FIG. 22, in this example, the arrangement of "High" nodes and "Low" nodes is equalized or normalized in a manner similar to that described above with reference to FIGS. 7 and 8A-8B, by arranging in a checker board type of pattern of "High" temperature and "Low" temperature nodes 100. In addition to this information, by applying the heat distribution management processes described above for the first embodiments (including monitoring temperature and migration of volumes as discussed in FIG. 10) to nodes instead of to parity groups, equalization of heat distribution (i.e., temperature) among the storage nodes 100 is achieved. For example, if a particular storage system node designated as a "Low" temperature node has a temperature that is greater than "A", then that node will be instructed to transfer one or more volumes having high access loads to another node designated as a "High" temperature node that has sufficient capacity to accommodate the one or more volumes. As explained in the first embodiment, equalization of heat distribution avoids inefficiency caused by over-cooling areas that do not require it, thereby achieving more efficient overall cooling.

According to the above process, the management of heat distribution regarding multiple storage system nodes 100 according to the specified rule is achieved. As an alternative method, management software 521 on management computer 520 may manage and instruct adjustment of the locations of volumes among the plurality of nodes 100 by receiving and processing the information mentioned above instead of carrying out this process on one of nodes 100. Moreover, I/O path control software 504 may be used to efficiently move the volumes and maintain proper communication paths between a host 500 and the correct array controller 110 for accessing the volumes used by a particular host 500.

Additional Example of Area Information

Figure 24:
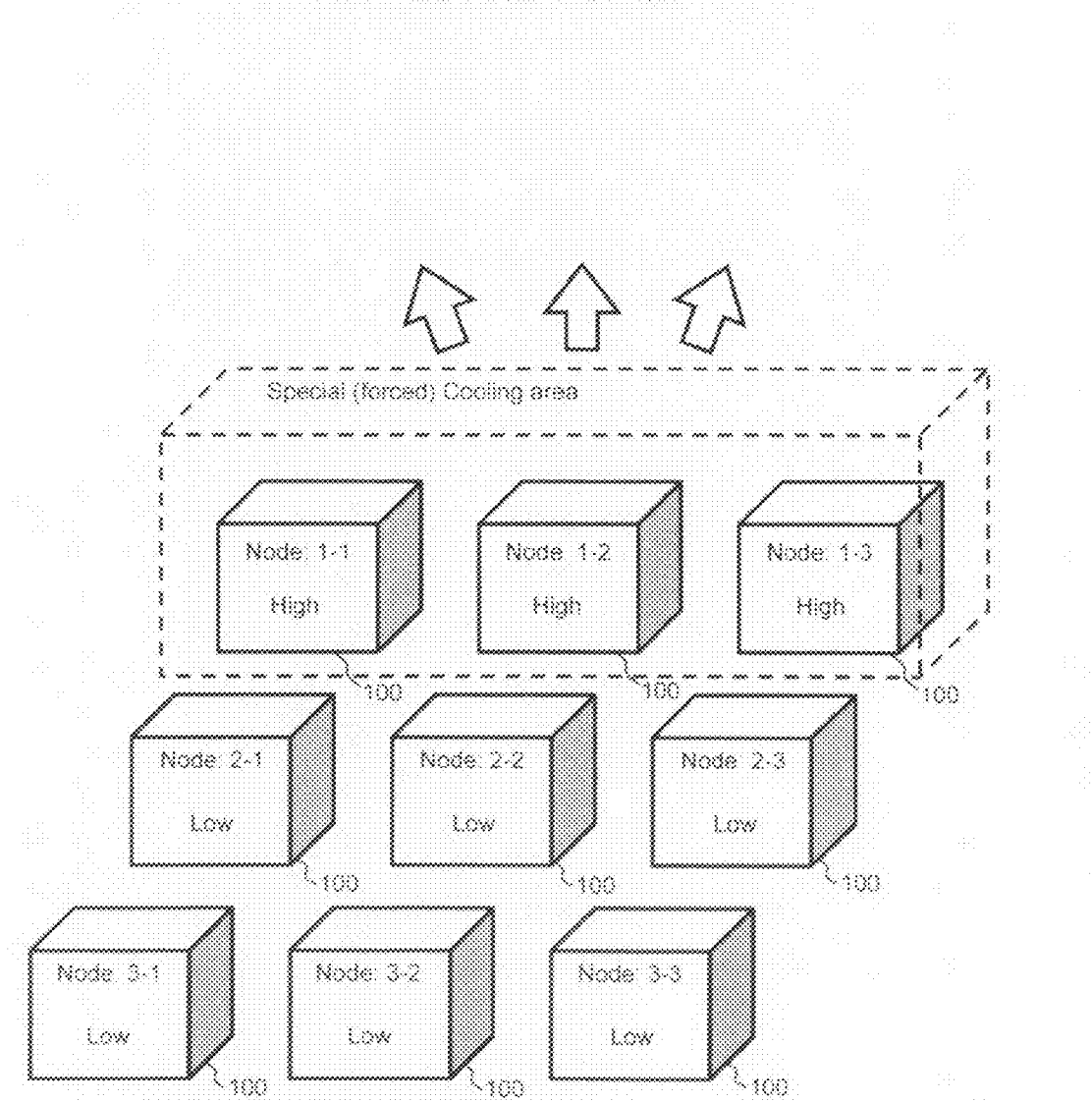
FIG. 24 illustrates an exemplary configuration for cooling of a storage system according to FIG. 22.

FIG. 23 illustrates another example of area information 204''' that illustrates another example of a rule of heat distribution that may be applied to the second embodiments. According to the area information 204''' of FIG. 23, a series of columns of nodes are designated as "Low" nodes while another series of columns of nodes are designated as "High" nodes, as illustrated in FIG. 24. The arrangement of FIG. 24 creates an intentional spatially-localized heat concentration. By concentrating cooling air on the heat concentration within a well-planned data center space, the localization of heating and cooling enables a greater efficiency in cooling the equipment that needs cooling, thereby resulting in reduced power consumption.

Third Embodiment

Figure 25:
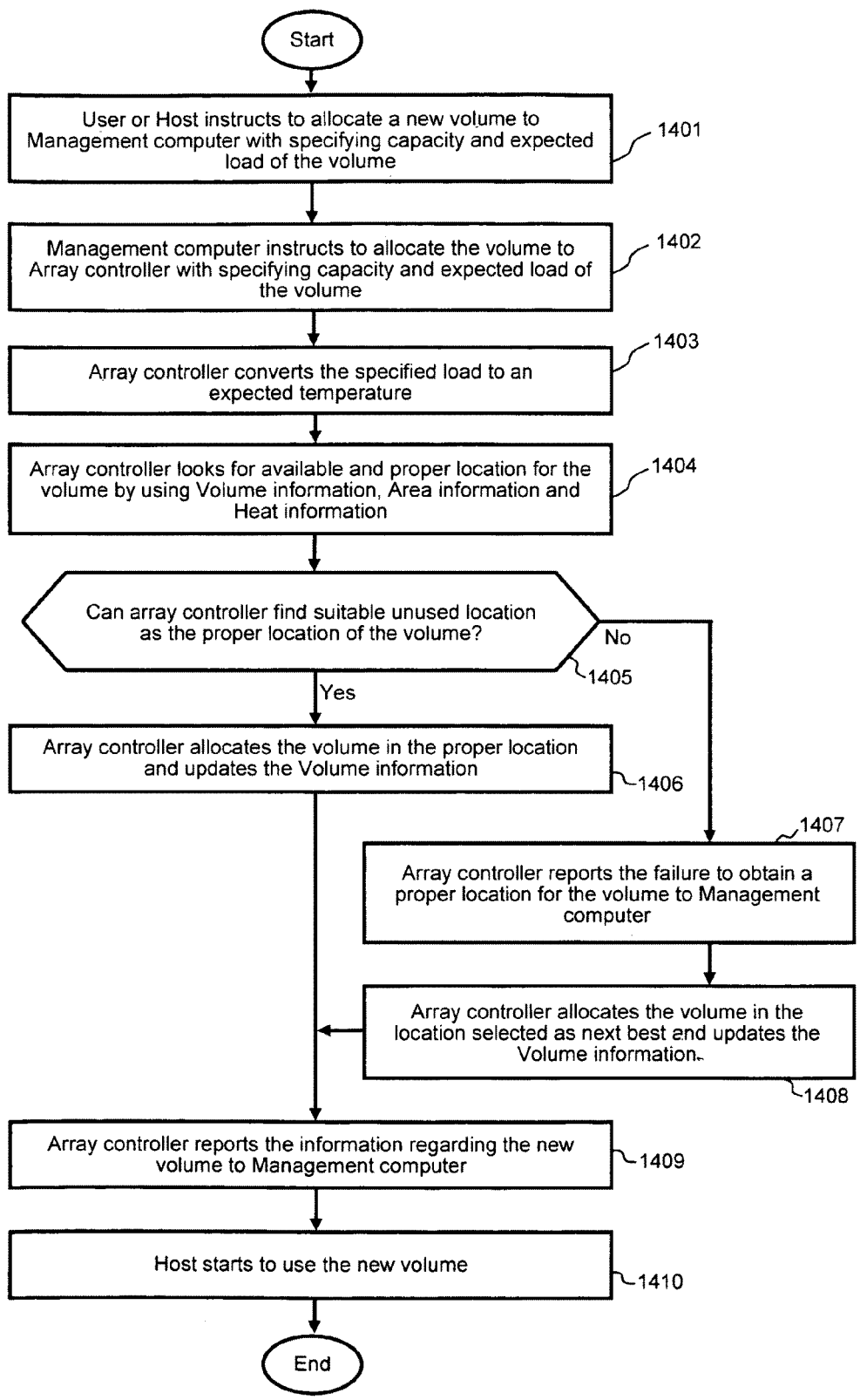
FIG. 25 illustrates an exemplary process for carrying out a third embodiment of the invention.

A rule of heat distribution described in area information 204 can be applied in allocating a new volume. FIG. 25 illustrates an example of a process to allocate a new volume. The system configuration in which the process of FIG. 25 is applied may be the system configuration described in the first embodiment or the second embodiment.

At step 1401, a user or host 500 instructs the allocation of a new volume to management computer 520, including a specification for capacity and expected load of the volume (e.g., expected iops or MB/s).

At step 1402, management computer 520 instructs an array controller 110 to allocate the volume by specifying the capacity and the expected load. In the case of the second embodiments, the management computer 520 may choose an array controller at one of nodes 100 that is able to serve as a management node. Alternatively, the instruction to allocate the new volume may be made directly to one of the array controllers from the user or host, thereby bypassing the management computer 520.

At step 1403, array controller 110 converts the specified load to an expected temperature. For example, array controller 110 may utilize access information 202 and heat information 205 for estimating an expected temperature at a location if the volume having the specified load is added to that location. In this case, array controller 110 acquires relation information between the load and the resulting temperature by checking the correspondence of data collected in access information 202 and heat information 205, and then applies the relation information for obtaining the expected temperature from the specified load.

At step 1404, array controller 110 seeks an available (unused) and otherwise proper location for the volume by using volume information 203, area information 204 and heat information 205. In other words, array controller 110 looks for a location according to the applicable rule of heat distribution that also has sufficient available capacity.

At step 1405, if array controller 110 finds a suitable location for the new volume, the process goes to step 1406. If not, the process goes to step 1407.

At step 1406, array controller 110 allocates the volume in the location and updates volume information 203 accordingly.

At step 1407, array controller 110 reports the failure to obtain a proper location for the new volume to management computer 520.

At step 1408, array controller 110 selects a location for the volume as the next best according to the rule of heat distribution. Then, array controller 110 allocates the volume in the location and updates the Volume information 203 accordingly.

At step 1409, array controller 110 reports the completion of preparation for the new volume and the information regarding the new volume such as the location, path and LUN (logical unit number) to management computer 520 or host 500.

At step 1410, host 500 starts to use the new volume. Thus, with the above method, the new volume can be allocated according a rule of heat distribution described in the area information 204. In the above process, expected temperature may be specified by management computer 520 or host 500 instead of specifying expected load, and as an alternative method, conversion between load and temperature may be performed by management computer 520 or host 500, or the like.

Embodiments of the present invention enable more efficient cooling in a storage system or a facility having a number of storage systems. A user or manager of the storage system or facility can specify a rule of preferred heat distribution according to the design of the facility and the arrangement of equipment and cooling systems in the facility. In some embodiments, when a system of the invention detects a heat distribution that varies from the rule currently in force, the system adjusts the heat distribution by moving volumes. Thus, embodiments of the invention include the ability to define various rules of heat distribution regarding storage systems, and to adjust the heat distribution based on the rules for achieving more efficient cooling in an information system, such as a data center or other facility.

Fourth Embodiments

System Configuration

Figure 26:
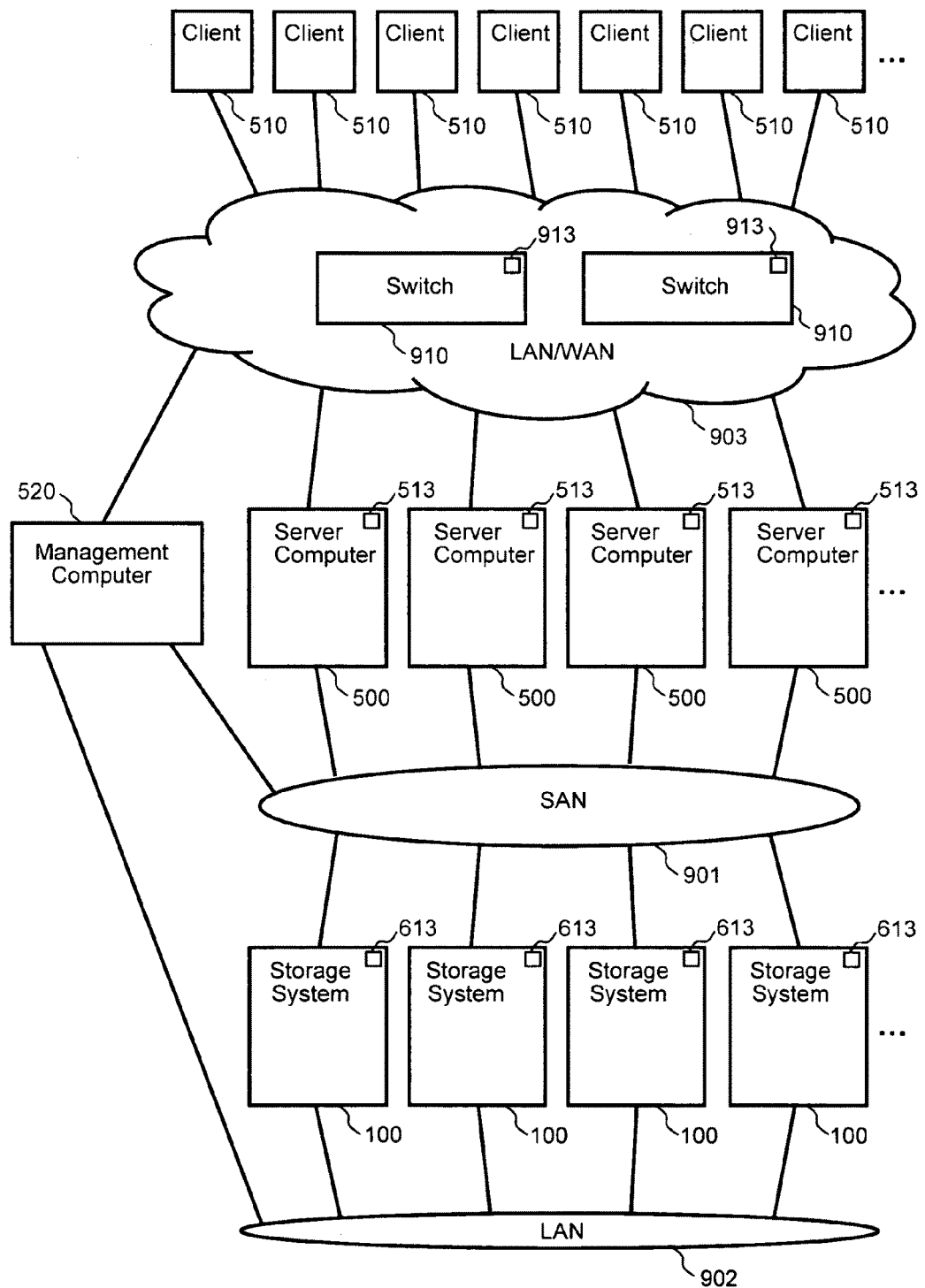
FIG. 26 illustrates an exemplary configuration in which the fourth and fifth embodiments of the invention may be applied.

The fourth embodiments may be directed to controlling heat in an entire information system, such as a data center, a communications facility, or the like. FIG. 26 illustrates an example of an information system configuration in which fourth embodiments of the invention may be applied, although the invention is not limited to any particular configuration. The information system of FIG. 26 includes one or more storage systems 100 in communication with one or more host computers 500, which may be server computers in the fourth embodiments, and a management computer 520, as also discussed in the foregoing embodiments. As illustrated in FIG. 26, one or more client computers 510 are in communication with server computers 500 via LAN/WAN 903 constructed to include one or more switches 910. In some embodiments, a client computer 510 is configured to send a request to be processed to one or more of server computers 500, and then a server computer 500 receiving the request may possibly access one or more of storage systems 100, if necessary, and respond with a result of the process by returning the result of the request to the requesting client 510.

As discussed above in the embodiments of FIGS. 1-25, temperature sensors may be included for monitoring the temperature of the equipment in the information system for use in controlling the heat distribution. For example, as illustrated in FIG. 26 each host computer 500 may include a temperature sensor 513 located inside or outside of its housing, or in the vicinity thereof. Similarly, each storage system 100 may also include one or more temperature sensors 613, as describe above in the earlier embodiments, and which may be located inside or outside its housing or in the vicinity thereof. Further, each switch 910 may also include a temperature sensor 913 located inside or outside its housing or in the vicinity thereof. Further, while temperature sensors are illustrated in FIG. 26 as being associated with each piece of equipment, temperature sensors may additionally or alternatively be associated with particular physical areas or sections of the information processing facility, as discussed further below.

Figures 27, 28:
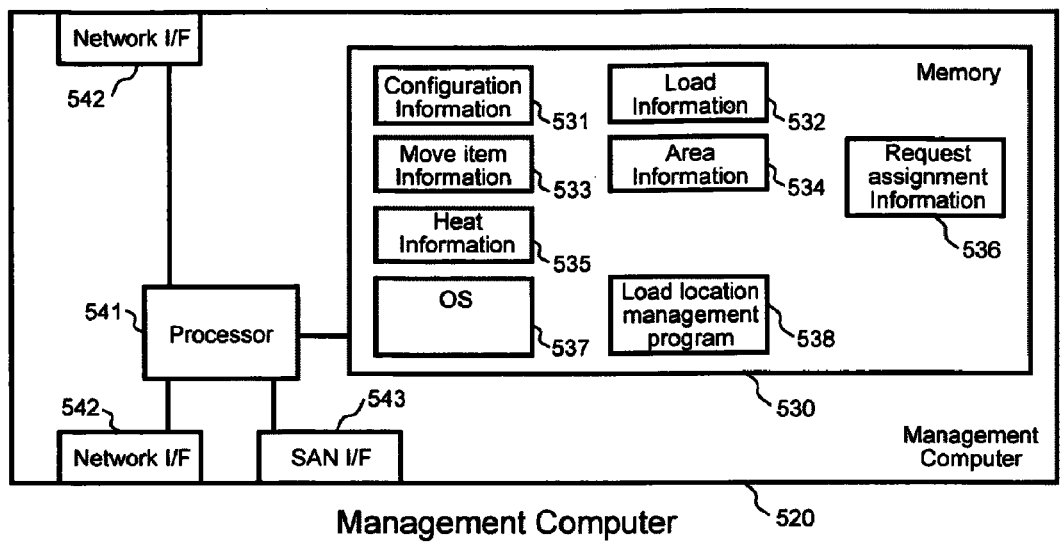
FIG. 27 illustrates an exemplary configuration of a management computer.
FIG. 28 illustrates an exemplary configuration information according to the fourth embodiments of the invention.

As illustrated in FIG. 27, management computer 520 includes a memory 530, a processor 541, network interfaces 542 for connecting to LAN 902 and LAN 903, and a SAN interface 543 for connecting to SAN 901. On the management computer 520, processor 541 performs various processes, such as are described below, by using a plurality of programs and data structures, which may be stored on memory 530 or other computer readable medium. The data structures of these embodiments include configuration information 531, load information 532, move item information 533, area information 534, heat information 535, and request assignment information 536, each of which is described further below. Processor 541 performs the processes of embodiments of the invention by executing one or more programs stored in memory 530 or other computer readable medium, and which include an operating system (OS) 537 and a load location management program 538 described further below. Management computer 520 may be one of host computers 500, or may be a separate dedicated computer.

Figure 29:
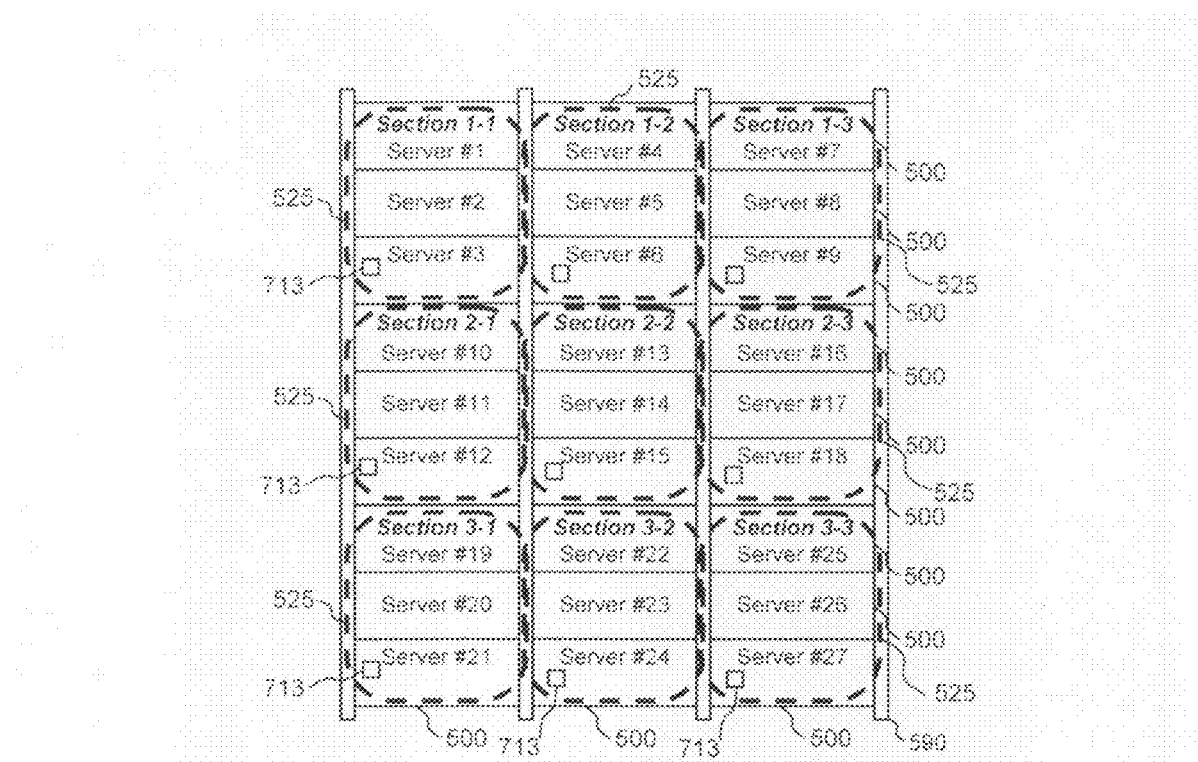
FIG. 29 illustrates an exemplary arrangement of sections of the information system in the fourth embodiments.
Figure 30:
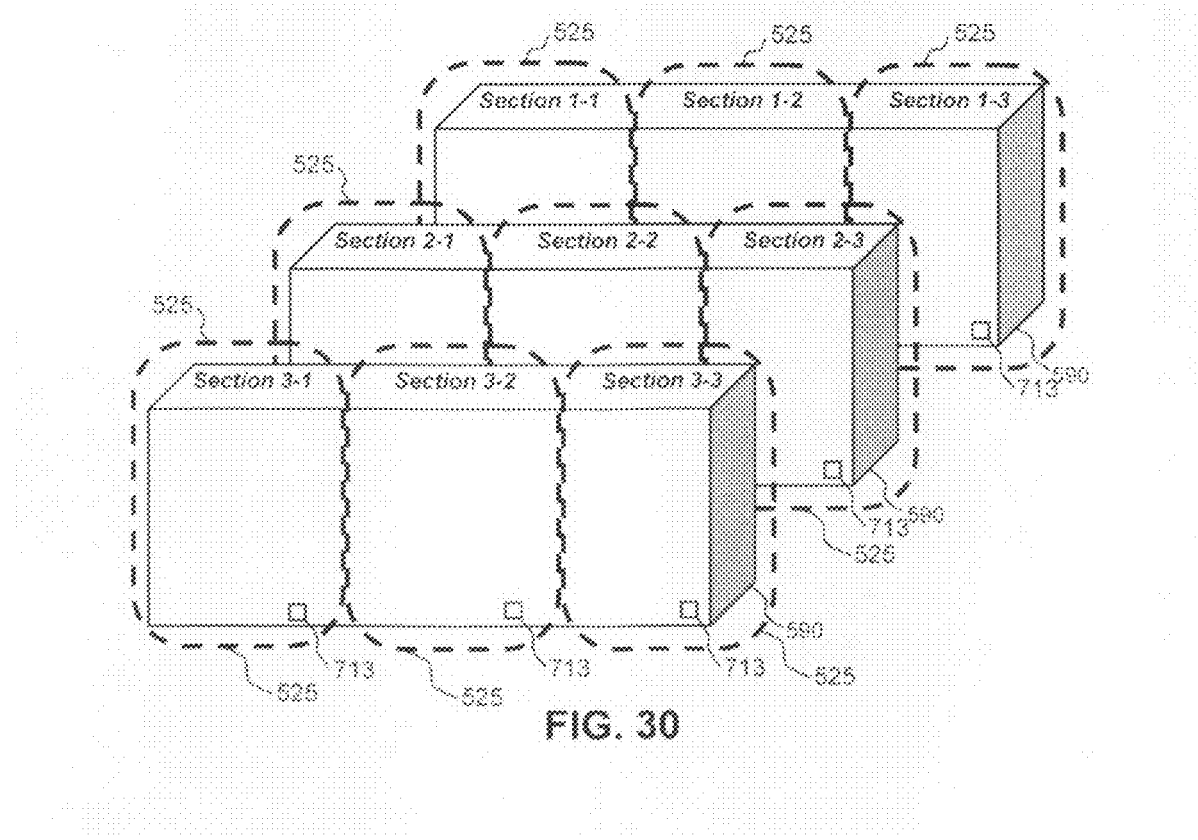
FIG. 30 illustrates an exemplary arrangement of sections of the information system in the fourth embodiments.

FIG. 28 illustrates an exemplary data structure of configuration information 531, which includes an entry 5311 for section and a corresponding entry 5312 for equipment. Configuration information 531 sets forth the location of equipment 5312 in each area or section 5311 of an information system or facility. In other words, the configuration information 531 maintains the relationship between particular equipment and the particular section of an information system in which the particular equipment is located. An example of one possible section configuration is illustrated in FIGS. 29 and 30. In FIG. 29, racks 590 are divided into sections 525, numbered 1-1 through 3-3 according to row and column, namely, rows 1 through 3 and columns 1 through 3 for a total of nine distinct sections in the illustrated embodiment, although any number of sections may be created according to various configurations. In the embodiment of FIG. 29, three computers 500 are located in each section 525, as also registered in configuration information 531, although the invention is not limited to any particular number of equipment pieces per section. As illustrated in FIG. 30, sections 525 can also be defined for aligned multiple racks that form aisles. For example, a number of computers 500 or other pieces of equipment may be contained in each section 525 of FIG. 30. In the embodiments of FIGS. 29 and 30, each section 525 may include a temperature sensor 713 in place of or in addition to any temperature sensors 513, 613, 913 on the various pieces of equipment. Alternatively, to sensors 713, of course, temperature sensors 513, 613, 913 may be provided and the output of these sensors averaged or otherwise used to determine the temperature at each section 525 of the information system.

Figure 31:
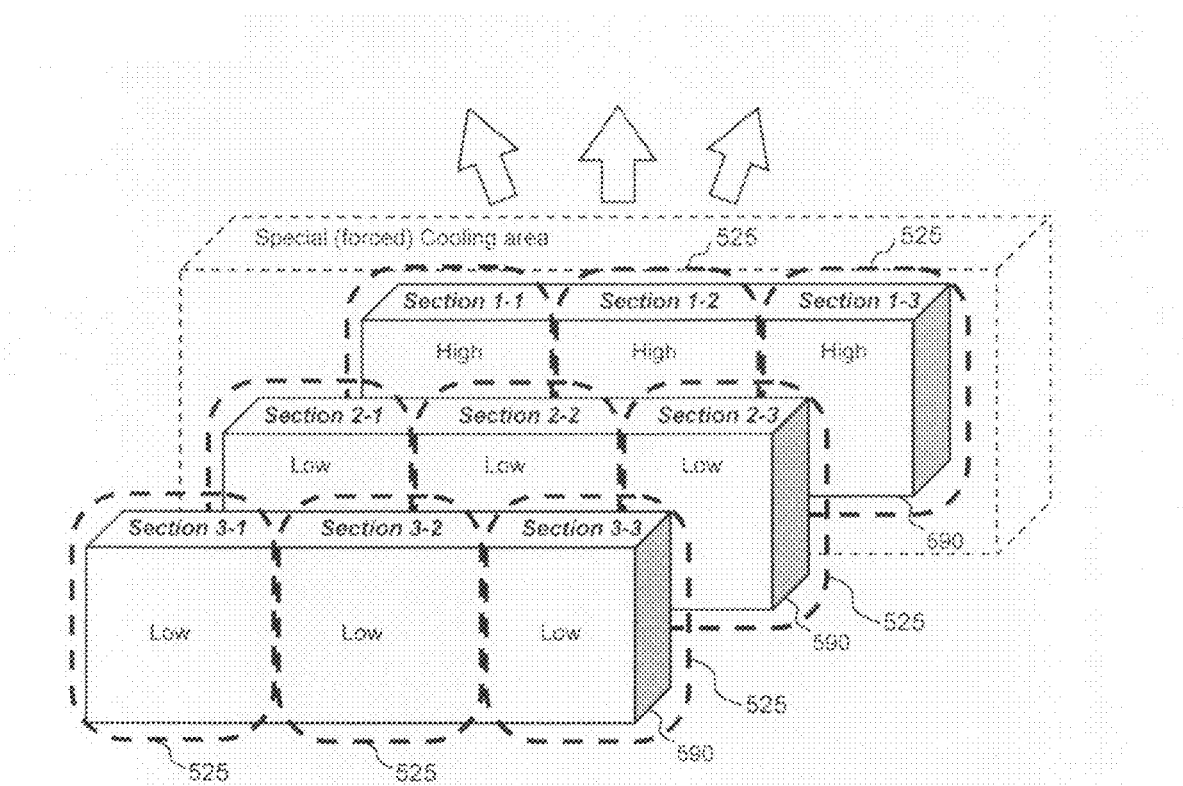
FIG. 31 illustrates an exemplary arrangement of high temperature and low temperature sections in the fourth embodiments.

FIG. 46 illustrates an exemplary data structure of area information 534, which includes area name 5341, such as "low" or "high" temperature area, condition 5342, and section ID 5343. In these embodiments, area information 534 may be defined in a similar manner to area information 204 of FIGS. 7, 14, 21 and 23 discussed above in the earlier embodiments. For example, as illustrated in FIG. 31, a heat distribution rule can be specified by using definitions corresponding to area definitions shown in FIG. 46, which is similar to the definitions described above with respect to FIG. 23. As illustrated in FIGS. 31 and 46, some sections may be specified as high temperature areas, and subject to special forced cooling, while other sections may be specified as low temperature areas which do not require forced cooling. Other definitions, including, but not limited to, those discussed above with respect to FIGS. 7, 14, and 21 may also be applied as other rules of heat distribution. For example, a configuration resembling a checkerboard pattern of high and low sections may be used, such as is illustrated in FIGS. 7 and 8, a configuration such as is illustrated in FIGS. 14-16 may be used, configurations such as are illustrated in FIGS. 21-24 may be used, or various other configurations may be used. Further, it is not necessary that "high" and "low" areas be designated, and instead, the loads among equipment may be adjusted to simply attempt to equalize the temperatures within a specified range.

FIG. 47 illustrates an exemplary data structure of heat information 535, which includes section ID 5351 and temperature 5352. The heat information 535 is maintained as described above in the earlier embodiments, such as with respect to FIG. 9, by monitoring the temperature of each section or piece of equipment in the data center. That is, each section has one or more temperature sensors, such as temperature sensors 713 and/or 513, as described above, and the management computer 520 records the temperature of each section in heat information 535 by gathering or receiving input from the temperature sensor(s) via LAN 902 or LAN 903. Heat information 535 may contain the temperature of each section at a periodic interval in time, as described above with respect to heat information 205 illustrated in FIG. 9.

Methods to Relocate Load

In order to manage heat distribution in the information system, the temperature at various areas of the information system may be adjusted by transferring the load on the equipment among various pieces of equipment in those areas and other areas in the information system so that a desired heat distribution pattern is achieved. The following description sets forth three examples of methods for managing the relocation of loads on equipment, although the invention is not limited to any particular method. For example, in alternative methods, applications may be migrated from one computer 500 to another, computers 500 may be physically relocated to other sections of the information system, or the like.

A first example of a method for relocating or distributing a load is through migration of a VM (virtual machine) by using virtual machine software. FIG. 32 illustrates an example of a configuration to which this method may be applied. FIG. 32 illustrates a portion of the information system illustrated in FIG. 26, including a pair of computers 500 having names of "Server#1" and "Server#10". In FIG. 32, computers 500 each include a hypervisor 710 able to run one or more virtual machines VM 711. Hypervisor 710 is virtual machine software, such as VMware ESX Server available from VMware Inc., of Palo Alto, Calif., MS Virtual Server and Hyper-V available from Microsoft Corp. of Redmond, Wash., or the like, which is able to provide multiple virtual server environments for several different kinds of operating systems, so that multiple operating systems can run on the hardware of a single computer 500. In addition to this, hypervisor 710 provides a function that enables dynamic migration of a running virtual machine from a first server hardware to a different server hardware in cooperation with a hypervisor 710 on the other server hardware.

In the example, each VM 711 is a virtual and independent server environment on which an OS and application software can run. When a VM 711 is relocated from one computer 500 to another computer 500, the processing load of the processes being performed in the relocated VM 711 are also relocated to the destination computer 500. To manage the relationships between computers 500 and VMs 711, management computer 520 gathers information regarding the various VMs 711 and their locations on the various sever computers 500 from the computers 500. This information may be obtained by the management computer 520 sending inquiries to the various computers 500 via LAN 903, and maintaining the collected information in the move item information 533. FIG. 33 illustrates an example of move item information 533, which includes server ID 5331 and VM ID 5332. FIGS. 32 and 33 illustrate an example showing that VM#3 has been dynamically relocated from Server#1 to Server#10 to reduce the processing load on Server#1, and thereby reduce the amount of heat generated by Server#1.

A second example of a method for relocating or distributing a load is through migration of process by using clustering software. FIG. 34 illustrates an example of a configuration to which this method may be applied. FIG. 34 illustrates a portion of the information system illustrated in FIG. 26, including a pair of computers 500 having names of "Server#1" and "Server#10". In FIG. 34, computers 500 include operating systems (OSs) 720, clustering software 730 and processes 731. Clustering software 730, such as MS Windows Server Computer Cluster available from Microsoft Corp. of Redmond, Wash., Veritas Cluster Server available from Symantec Corp., of Cupertino, Calif., or the like, is able to provide coordinated operation of multiple computers 500 so as to realize high availability and control of workloads on each computer 500.

Included in the function of clustering software 730, a process 731 (i.e., a job), such as, for example, processing of a request on a computer 500, is able to be handed over to another computer 500 in cooperation with the other computer 500. When a process 731 is relocated from one computer 500 to another computer 500, the load of the process is also relocated to the destination computer 500, thereby reducing the load on the original computer 500. In order to manage the relationships between computers 500 and the various processes 731, management computer 520 gathers information regarding the various processes 731 and their locations on the various sever computers 500. This information may be obtained by the management computer 520 sending inquiries to the various computers 500 via LAN 903, and maintaining the collected information in the move item information 533'. FIG. 35 illustrates an example of move item information 533', which includes server ID 5331 and process ID 5333. FIGS. 34 and 35 further illustrate an example showing that Process#3 has been dynamically relocated from Server#1 to Server#10 to reduce the processing load on Server#1, and thereby reduce the amount of heat produced by Server#1.

The third example of a method for relocating or distributing a load is through using request assignment control on switches 910 to manage loads on equipment. FIG. 36 illustrates an example of a configuration to which this method may be applied. FIG. 36 illustrates a portion of the information system illustrated in FIG. 26, including a pair of switches 910 that include request assignment information 911 and request assignment program 912. Under this method, particularly applicable in web services, switches are able to assign requests that they receive from clients to particular computers 500 in the in the information system. For additional information, the reader is referred to, for example, "Catalyst 6500 Series Switch Content Switching Module Configuration Note Software Release 4.2(x)", Cisco Systems, Inc., San Jose, Calif., USA, December 2006, the entire disclosure of which is incorporated herein by reference.

FIGS. 37 and 38 illustrate two examples of request assignment information 911 that may be applied in some embodiments of the invention. A first example of request assignment information 911, as illustrated in FIG. 37, includes a server ID 9111 and a request assignment rate 9112. Request assignment information 911 of FIG. 37 may be used by a switch 911 to define a distribution rate of requests from clients 510 to computers 500, namely, what percentage of requests are directed to each computer 500. By adjusting the percentage of requests that each computer 500 receives, the processing load on each computer 500 can be controlled. A second example of request assignment information 911', as illustrated in FIG. 38, includes a server ID 9121 and a bandwidth 9122. The request assignment information 911' of FIG. 38 defines an upper limit of bandwidth for communication regarding requests from clients 510 to computers 500. For example, the bandwidth limits set forth in request assignment information 911 may be the maximum amount of bandwidth permitted to be used by each server. By adjusting the amount of bandwidth that each computer 500 is able to use, the processing load on each computer 500 can be controlled. Typically either first request assignment information 911 or second request assignment information 911' would be used, but both might be used in some situations, or other conditions might be used for request assignment information in some situations in addition to or as an alternative to assignment rate percentage and/or bandwidth.

Request assignment program 912 on each switch 910 is able to control the load on computers 500 by adjust assignment of requests from clients 510 to computers 500 according to conditions maintained in the request assignment information 911. To perform this control, switch 910 provides a virtual interface (e.g., an IP address and port number) so as to be a target to receive requests from clients instead of having the interface of each computer 500 act as the target. Thus, a client 510 sends a request to the virtual interface provided by the switch, and then the request assignment program 912 transfers (assigns) the request to one of computers 500. In other words, switch 910 provides a virtual interface that aggregates computers 500. By changing conditions (i.e., request percentage or bandwidth) defined in request assignment information 911, the load on each computer 500 can be changed. The control can also be performed among multiple switches 910 by communication between the multiple switches 910 in LAN 903. Alternatively, the request assignment information 911 and request assignment program 912 can be implemented in computers 500 so that computers 500 have the capability to control load distribution regarding processing of requests.

Monitoring of Load

Heat distribution in the information system is able to be managed by controlling the load on equipment in particular areas of the information system. In order to manage heat distribution by controlling loads on equipment, information regarding the loads may be collected. In some embodiments, management computer 520 collects information regarding loads of items such as VMs 711, processes 731 and computers 500 via LAN 903. The information regarding load is recorded and maintained in load information 532, which may be similar to access information 202 described in the above embodiments with respect to FIG. 4.

FIG. 39 illustrates an example of load information 532 pertaining to VMs. Load information 532 includes an item ID 5321, a load measurement type 5322 and an amount of load 5323 according to one or more of the load measurement types for each type of item. These parameters may be collected and recorded according to predetermined time periods, or the like, such as an average per hour basis, or other suitable quantity. For example, in the embodiment illustrated in FIG. 39, the load for each VM may be tracked according to the amount of CPU usage, the amount of memory usage, number of transaction processed by VM per unit of time (i.e., per second) and amount of transferred data for processes performed by VM per unit of time (e.g., MB/second). Management computer 520 can also maintain similar information regarding other type of items in the information system, such as processes and other server loads as load information 532. In addition to the above-discussed monitoring, management computer 520 can collect request assignment information 911 from switches 910, and store the information in request assignment information 536 in memory 530.

Process for Maintaining Proper Distribution of Heat

Figure 40:
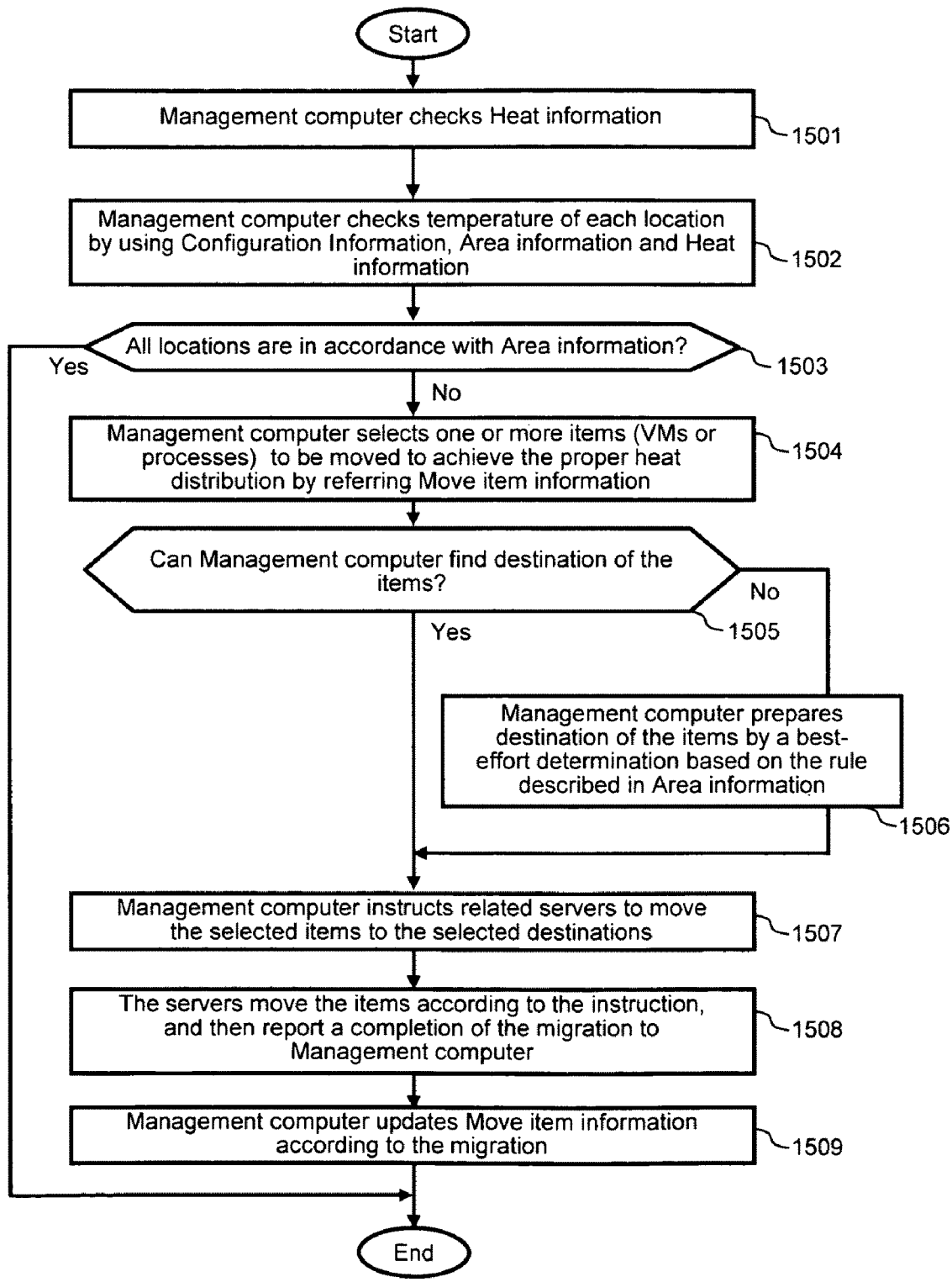
FIG. 40 illustrates an exemplary process for heat distribution in the fourth and fifth embodiments.
Figure 41:
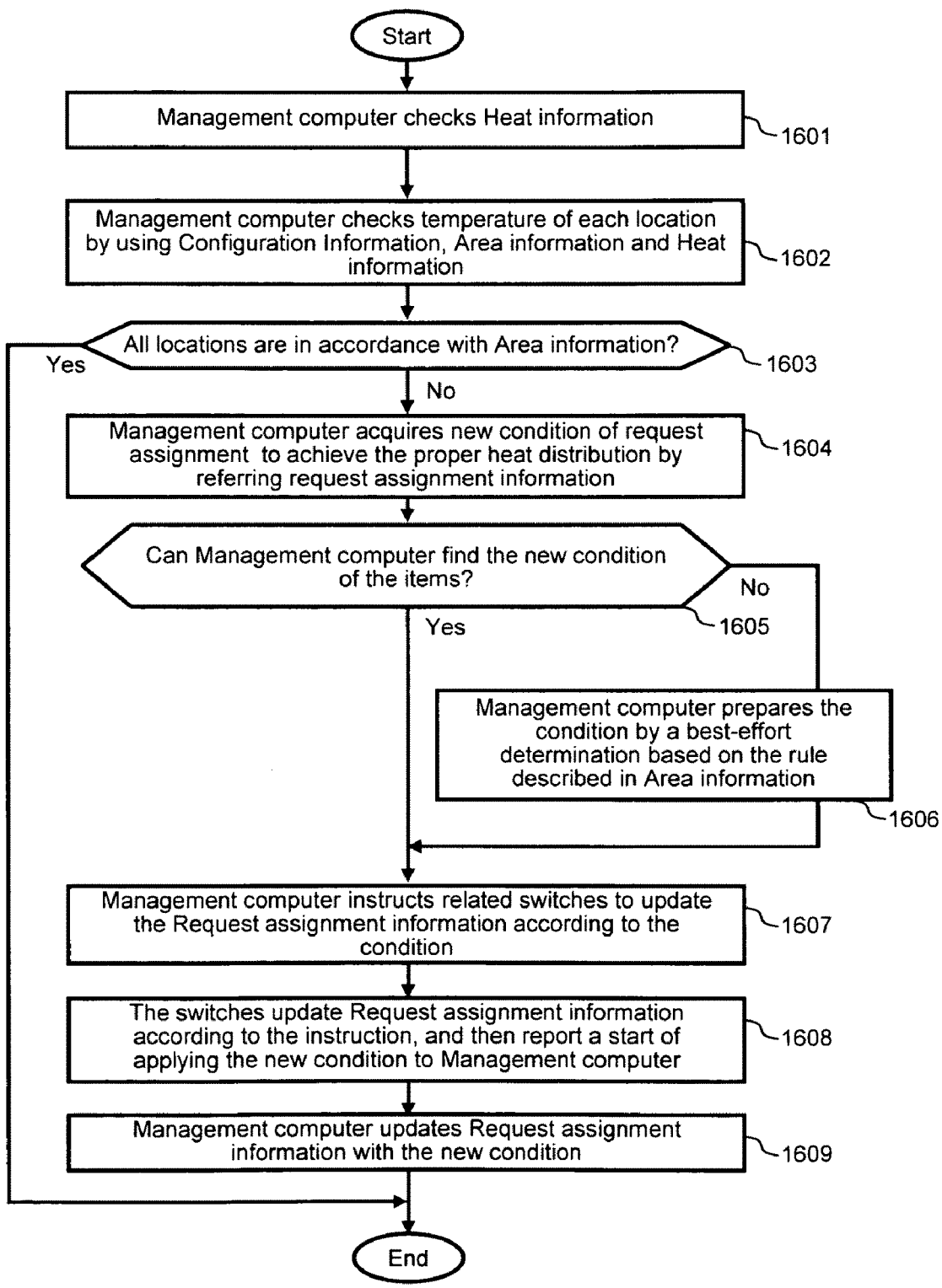
FIG. 41 illustrates another exemplary process for heat distribution in the fourth and fifth embodiments.

FIG. 40 illustrates an exemplary process for maintaining a desirable heat distribution in the information system. By following the process described in FIG. 40 according to a rule defined by area information 534, a desired heat distribution pattern can be achieved in an information system by using migration of VMs, migration of processes, or other load redistribution methods. Thus the following procedure of FIG. 40 is applicable to the first two exemplary relocation methods discussed above, and a number of other relocation methods, while the process of FIG. 41 is applicable to the third exemplary relocation method that uses request assignment information.

At step 1501, management computer 520 checks heat information 535 at a predetermined periodic interval or in response to an alarm if one of temperature sensors 513 or 713 indicates a temperature above a predetermined temperature. A user can specify the predetermined interval from management computer 520, or change the interval as desired.

At step 1502, management computer 520 checks the temperature of each section in the information system by using configuration information 531, area information 534 and heat information 535. Management computer 520 verifies whether the condition described in area information 534 is being maintained or not.

At step 1503, if the heat distribution based on the conditions is being maintained in accordance with the area information 534, then the process ends. If not, then the process goes to step 1504 to take corrective action.

At step 1504, management computer 520 selects one or more items (for example, VMs or processes) to be moved to achieve the proper heat distribution. This step is performed in the same manner as described regarding step 1104 in FIG. 10 in the embodiments described previously, except that the process uses the relation between section and item (e.g., a VM or process) instead of the relation between parity group and volume. For example, when management computer 520 finds a "Low" section 525 (i.e., a section belonging to the "Low" area according to area information 534, such as is illustrated in FIGS. 31 and 46) that has a higher temperature than the condition specified for "Low" (i.e., "T" is not less than "A"), the management computer 520 selects the item 5321 having the largest load in that section 525 by referring to load information 532. Alternatively, when management computer 520 finds a "High" section 525 (i.e., a section belonging to the "High" area according to area information 534) that has a lower temperature than the condition of "High", the management computer 520 may be configured to select the item having the smallest load in the section 525 by referring to load information 532. Which frees processing capacity to allow a high load can be migrated to the section as mentioned below.

At step 1505, management computer 520 seeks destinations for the item(s) needed to be moved to satisfy the conditions that are not being maintained. If management computer 520 is able to find the locations that meet the requirements for relocation of the item (for example, available processing capacity), the process proceeds to step 1507. On the other hand, if there are no locations that meet all the requirements, the process goes to step 1506. For example, at step 1505, when management computer needs to move an item from a "Low" section to a "High" section, management computer selects a computer 500 having unused capacity in one of the "High" sections 525 (i.e., a section classified as being in the "High" area) as a target destination for migration of the item. By moving the item having the highest load (i.e., a generator of a large amount of heat due to a large amount of processing requirements) to a "High" section 525, the heat at the "Low" section is reduced, and instead the item is located at a section that is allowed to have higher heat according to the heat distribution pattern established by the rule of FIGS. 31 and 46. Alternatively, instead of just moving the item to the unused location, management computer may swap the item at the "Low" section with an item having a low load in one of "High" sections if the management computer is able to find an item having a low load eligible to be moved. Similarly, for example, when a "High" section is not within the conditions, then at step 1505, management computer 520 selects a computer 500 having unused capacity in one of the "Low" sections 525 (i.e. belonging to a "Low" section 525 according to area information 534) as a target destination for migration of the item having a low load. By moving the item having the low load to a "Low" temperature section 525, an unused capacity is created in the particular "High" section 525, which means that an item of higher load can be migrated to the unused capacity. Therefore, the heat distribution is automatically adjusted to the distribution set forth by the rule, as illustrated in FIGS. 31 and 46. Alternatively, instead of just moving the low load item to the unused capacity in one of the "Low" sections, management computer 520 may automatically swap the low-load item with an item having a high load that is located in one of the "Low" sections 525.

At step 1506, on the other hand, when management computer 520 cannot locate an appropriate destination for the item, then management computer 520 can select a destination of the item by a best-effort determination based on the category described in area information 534. As one example of the best-effort determination, management computer 520 may select a location that can bring the heat distribution closer to the condition even if the condition is not completely satisfied. As another example, of a best-effort determination, management computer 520 may decide not to perform any change (i.e., no relocation operation is performed) if there will be only minimal improvement that does not warrant the carrying out of a relocation procedure.

At step 1507, management computer 520 instructs the affected computers 500 to relocate the selected item(s) to the selected destination(s). For example, as discussed above, in the case of a VM, the instructions may be sent to hypervisors 710 of the affected computers 500. Similarly, in the case of moving processes, the instruction may be sent to the clustering software 730 on the affected computers 500.

At step 1508, the computers 500 move the item according to the instruction, and then report a completion of the migration to management computer 520.

At step 1509, the management computer 520 updates the move item information 533 according to the migration of the item(s). Thus, with the above process, the management of heat distribution in carried out within the information system according to the specified rule(s).

FIG. 41 illustrates another exemplary process for maintaining a desired heat distribution in the information system. By following the process described in FIG. 41, according to the rule(s) defined by area information 534, proper heat distribution among the equipment in the information system can be achieved through use of the request assignment control discussed above.

At step 1601, management computer 520 checks heat information 535 at a predetermined periodic interval or in response to an alarm if one of temperature sensors 513 or 713 indicates a temperature above a predetermined temperature. A user can specify the interval from management computer 520, or change the interval as desired.

At step 1602, management computer 520 checks the temperature of each section by using configuration information 531, area information 534 and heat information 535. Management computer 520 verifies whether or not the rule(s) described in area information 534 is being maintained.

At step 1603, if the heat distribution based on the rule(s) is being maintained in accordance with the area information 534, then the process ends. If not, then the process goes to step 1604 to take corrective action.

At step 1604, management computer 520 acquires a new condition of request assignment (i.e., assignment of load) to achieve the proper heat distribution. This step is performed in the same manner described regarding step 1504 in the aforesaid embodiments except that the request assignment information 536, such as illustrated in FIGS. 37-38, is referred to. Management computer 520 refers to the request assignment information 536 to determine a new condition for a particular computer 500. For example, if request assignment rate percentage is used, as illustrated in FIG. 37, when it is desired to reduce the heat generated by a server, the request assignment rate percentage of the particular computer 500 might be decreased. Similarly, if the bandwidth is used as illustrated in FIG. 38, the bandwidth allocated to a particular computer 500 might be decreased. In the case of bandwidth reduction, other considerations might be taken into account. For example, if a particular application running on a computer 500 requires a certain minimum bandwidth, then a lower threshold might be provided below which the bandwidth will not be reduced.

At step 1605, if management computer 520 is able to find a change in conditions of the request assignment information that meets the rule(s), the process proceeds to step 1607. On the other hand, if management computer 520 cannot find a change in the conditions that meets the rule(s), the process goes to step 1606.

At step 1606, management computer 520 tries to obtain the new condition by a best-effort determination based on the category described in area information 534. As one example of the best-effort determination, management computer 520 may choose a change in a request assignment condition (i.e., bandwidth or assignment percentage) that can bring the heat distribution closer to the heat distribution condition even if the heat distribution condition is not entirely satisfied. As another example, management computer 520 may decide not to perform any change (i.e., no change operation is performed) if there will be only minimal improvement resulting from the change.

At step 1607, management computer 520 instructs related switches 910 to update the request assignment information 911 according to the conditions of the request assignment information that the management computer has determined should be changed.

At step 1608, the switches 910 update request assignment information 911 according to the instruction from the management computer, and then report the start of applying the new conditions to management computer 520.

At step 1609, the management computer 520 updates the request assignment information 536 according to the new condition(s).

Alternatively, in embodiments where request assignment information 911 and request assignment program 912 are implemented in computers 500 as mentioned above, management computer 520 sends the instruction to the related computers 500 instead of to switches 911, and the computers 500 report to the management computer 520 when they begin applying the new condition(s). Thus, the above process is able to achieve management of heat distribution within the information system according to a specified rule. This enables efficient cooling and reduced power consumption in an information system, such as a data center, communications facility, or other information system.

Fifth Embodiments

System Configuration

Figures 42, 43:
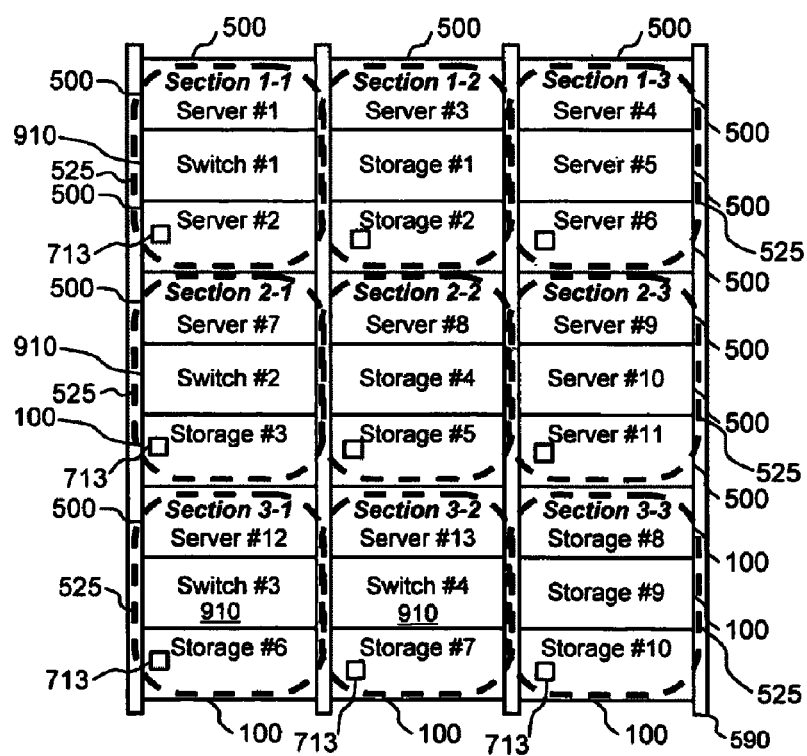
FIG. 42 illustrates the exemplary data structure of configuration information for the fifth embodiments.
FIG. 43 illustrates an exemplary arrangement of sections of the information system in the fifth embodiments.

The fifth embodiments of the invention are directed to management of the heat distribution of all the equipment in an information system. The fifth embodiments of the invention will be described using the same configuration as illustrated in FIG. 26 described in the previous embodiments, although the invention is applicable to other information system configurations as well. FIG. 42 illustrates another example of configuration information 531'. Configuration information 531' can also include information of various types of equipments such as appliances, blades and processors. Further, configuration information 531' may be managed as a CMDB (configuration management database). Additionally, in these embodiments, each section can include not only computers 500, but also other types of equipment, such as storage systems 100 and switches 910, as equipment to be managed to achieve a desired heat distribution as defined in area information 534.

Figure 44:
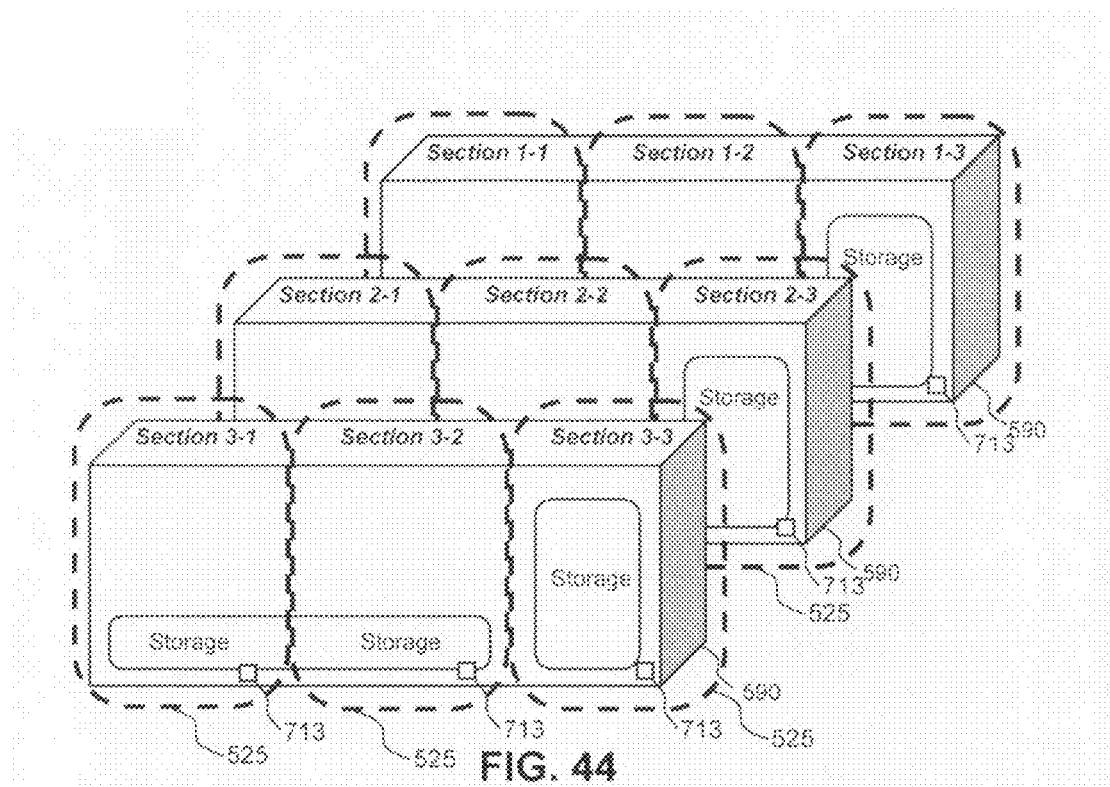
FIG. 44 illustrates an exemplary arrangement of sections of the information system in the fifth embodiments.
Figure 45:
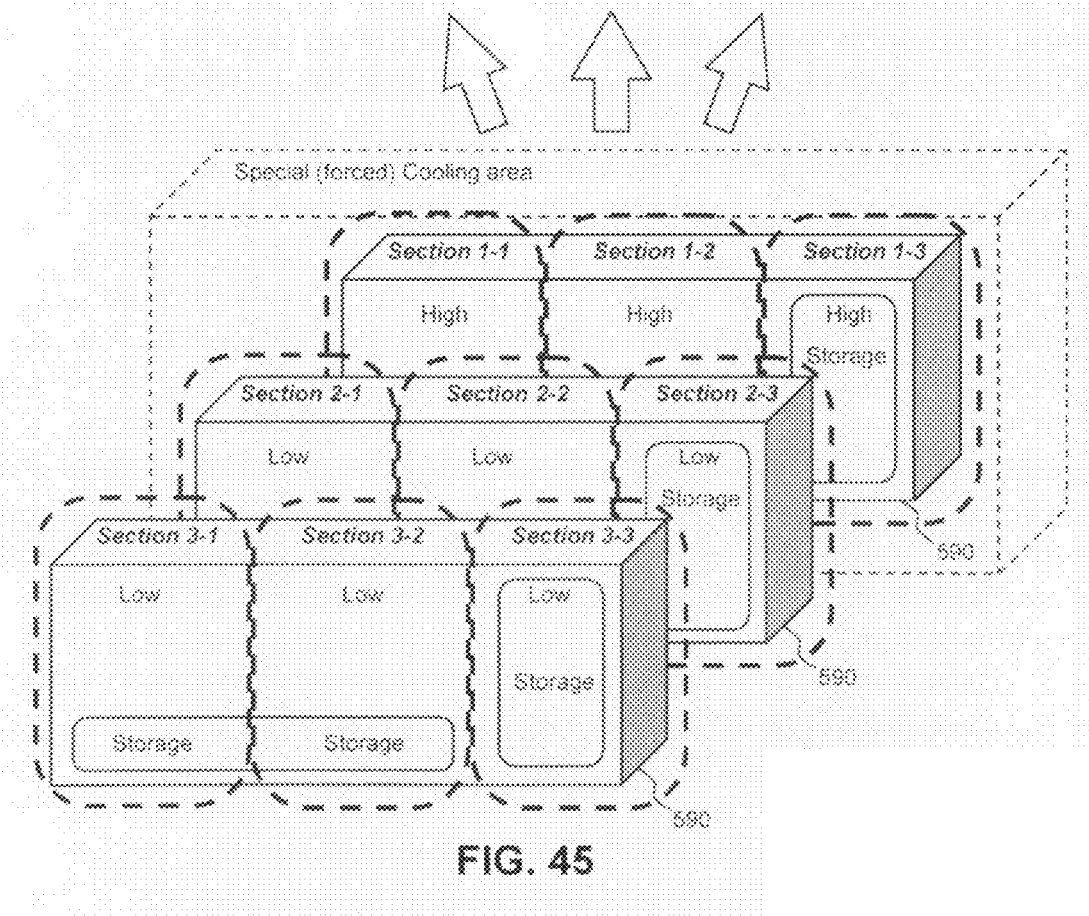
FIG. 45 illustrates an exemplary arrangement of high temperature and low temperature sections in the fifth embodiments.

Examples of definitions of the sections of these embodiments are illustrated in FIGS. 43 and 44. In FIG. 43, racks 590 are divided into sections specified by row and column, and not only servers 500 but also storage system 100 and switches 910 are located in each section as registered in configuration information 531'. For example, as illustrated in FIG. 43, section 1-1 includes a pair of computers 500 and a switch 910, while section 2-1 includes a computer 500, a switch 910 and a storage system 100. Further, as illustrated in FIG. 44, sections can also be defined for aligned multiple racks that form aisles. Area information 534 may be defined as described above with respect to the earlier embodiments. For example, a heat distribution rule as illustrated in FIG. 45 may be specified by using definitions corresponding to the definitions set forth in FIG. 46.

Other definitions mentioned above can also be applied as other rules of heat distribution, as discussed above with respect to the fourth embodiments, such as those of FIGS. 7-8, 14-16, 21-24, 31 and 46. That is to say, the whole computer system including sever computers 500, storage systems 100 and switches 910 are able to share one definition of sections and one definition of a heat distribution rule. The heat distribution of the information system may be managed using the processes set forth in FIGS. 10, 40, and 41, as described above using temperature sensors 513, 613, 713 and/or 913. Then, by performing the process described in the first embodiments for storage systems 100 and by performing the processes described in the fourth embodiments for other equipment, such as computers 500 and switches 910, with the definition of sections and the definition of heat distribution rule in each process, a comprehensive management of heat distribution according to the shared rule is achieved for the whole computer system including sever computers 500, storage systems 100 and switches 910. Because the location of load (i.e., the processing of data) in computers 500 affects the location of the transaction load (i.e., the transferring of data) in switches 910, the heat distribution management can include switches 910 by controlling the load on computers 500. This can also, thereby, include network equipment in SAN 901. Further, a hierarchy may be established regarding whether to move storage components or server components as the item of first choice. For example, it may be a hierarchy that the process will first try to move items from computers 500 prior to moving volumes from storage systems 100, or other hierarchies may be adopted.

Thus, the fifth embodiments of the invention realize efficient cooling and reduced power consumption in information systems. In addition to the equipment discussed, the methods described above can also be applied to processes carried out in storage systems 100, such as file services (i.e., Network Attached Storage (NAS) capability) and content management services. Thereby the fifth embodiments of the invention provide another means for heat distribution management regarding storage systems 100, in addition to the earlier embodiments discussed above.

From the foregoing, it will be apparent that some embodiments of the invention provide methods and apparatuses for improving cooling efficiency and reducing power consumption in information systems. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the above description has been made in an illustrative fashion, and not a restrictive one. Accordingly, the scope of the invention should properly be determined with reference to the appended claims, along with the full range of equivalents to which such claims are entitled.

What is claimed is:

1. An information system comprising:
   a plurality of first computers located in a first section of the information system, and a plurality of second computers located in a second section of the information system;
   said plurality of first computers each having a first processing load;
   said plurality of second computers each having a second processing load;
   a first temperature sensor for sensing a first temperature condition for the first section; and
   a second temperature sensor for sensing a second temperature condition for the second section,
   wherein each processing load of said first and said second processing loads is determined by amount of CPU usage, number of transactions per unit time, and amount of transferred data per unit time for process of said each processing load,
   wherein, when a heat distribution determined from the first temperature condition and the second temperature condition is not in conformance with a predetermined rule for heat distribution, the information system is configured to relocate a first portion of the first processing load to the second computers or relocate a second portion of the second processing load to the first computers for attempting to bring the heat distribution into conformance with the rule,
   wherein there are a plurality of said first sections and a plurality of said second sections,
   wherein the heat distribution rule designates said first sections to be high temperature sections and said second sections to be low temperature sections, and
   wherein the heat distribution rule is implemented by assigning a higher processing load to the first computers in the high temperature first sections than to the second computers in the low temperature second sections.

2. The information system according to claim 1, further comprising:
   a first storage system in said first section; and
   a second storage system in said second section,
   wherein the information system migrates data from the first storage system to the second storage system or from the second storage system to the first storage system to aid in bringing the heat distribution into conformance with the rule.

3. The information system according to claim 1, further comprising:
   a first switch in said first section; and
   a second switch in said second section,
   wherein the information system migrates a transaction load from the first switch to the second switch or from the second switch to the first switch to aid in bringing the heat distribution into conformance with the rule.

4. The information system according to claim 1,
   wherein the plurality of first computers and the plurality of second computers include virtual machine software for running a plurality of virtual machines on the plurality of first computers and the plurality of second computers, and
   wherein the first or second processing load is respectively relocated between the first section and the second section by relocating one or more virtual machines between the first section and the second section.

5. The information system according to claim 1,
   wherein the plurality of first computers and the plurality of second computers include clustering software for running a plurality of processes on the plurality of first computers and the plurality of second computers, and wherein the first or second processing load is respectively relocated between the first section and the second section by relocating one or more processes between the first section and the second section.

6. The information system according to claim 1, further comprising:

at least one switch in communication with the plurality of first computers and the plurality of second computers, wherein the information system is configured to instruct the switch to adjust request assignment information to change the first and second processing loads in the first section and the second section, respectively, for attempting to bring the heat distribution into conformance with the rule.

7. The information system according to claim 1, further comprising:

a management computer, said management computer monitoring the heat distribution within the information system and sending instructions for relocating the first portion of the processing load or the second portion of the processing load.

8. The information system according to claim 1, wherein there are a plurality of said first sections and a plurality of said second sections, and wherein a predetermined heat distribution rule designates the first sections to be high temperature sections and the second sections to be low temperature sections, the high temperature sections being arranged according to the rule in one area of the information system, and the low temperature sections being located in another area.

9. The information system according to claim 1, wherein there are a plurality of said first sections and a plurality of said second sections, and wherein a predetermined heat distribution rule designates the first sections to be high temperature sections and the second sections to be low temperature sections, the high temperature sections being arranged according to the rule such that each high temperature section borders low temperature sections and each low temperature section borders high temperature sections in a checker board arrangement, such that no two high temperature sections border one another and no two low temperature sections border one another.

10. An information system comprising:

a plurality of first computers located in the information system and a plurality of second computers located in the information system;

said plurality of first computers each having a first processing load;

said plurality of second computers each having a second processing load; and temperature sensors for sensing temperature conditions associated with the plurality of first computers and the plurality of second computers, wherein each processing load of said first and said second processing loads is determined by one or more of amount of CPU usage, amount of memory usage, number of transactions per unit time, and amount of transferred data per unit time for process of said each processing load, wherein, when a heat distribution determined from the sensed temperature conditions is not in conformance with a predetermined rule for heat distribution, the information system is configured to relocate a first portion of the first processing load to the plurality of second computers or relocate a second portion of the second processing load to the plurality of first computers for attempting to bring the heat distribution into conformance with the rule, wherein the information system is divided into sections located in different physical areas of the information system, wherein the plurality of first computers are in one or more first sections, and the rule designates the one or more first sections as low temperature sections, wherein the plurality of second computers are in one or more second sections, and the rule designates the one or more second sections as high temperature sections, and wherein when the temperature condition in one of said low temperature sections is higher than a predetermined temperature, said information system relocates a portion of the first processing load from the first computer having a highest processing load in said low temperature section to one of said second computers in the one or more high temperature sections.

11. The information system according to claim 10, wherein the plurality of first computers and the plurality of second computers include virtual machine software for running a plurality of virtual machines on the plurality of first computers and the plurality of second computers, and wherein the first or second processing load is respectively relocated between the plurality of first computers and the plurality of second computers by relocating one or more virtual machines between the plurality of first computers and the plurality of second computers.

12. The information system according to claim 10, wherein the plurality of first computers and the plurality of second computers include clustering software for running one or more processes on the plurality of first computers and the plurality of second computers, and wherein the first or second processing load is respectively relocated between the plurality of first computers and the plurality of second computers by relocating one or more processes between the plurality of first computers and the plurality of second computers.

13. The information system according to claim 10, further comprising:

at least one switch in communication with the plurality of first computers and the plurality of second computers, wherein the information system is configured to instruct the switch to adjust request assignment information to change the first and second processing loads in the first section and the second section, respectively, for attempting to bring the heat distribution into conformance with the rule.

14. A method for heat distribution management in an information system comprising:

establishing a rule for heat distribution in which one or more first locations are designated for a first temperature condition and one or more second locations are designated for a second temperature condition;

monitoring the first temperature condition at the one or more first locations and the second temperature condition and the one or more second locations; and relocating at least a portion of a processing load from a first computer at one of said one or more first locations having a temperature above a predetermined temperature to a second computer at one of said one or more second locations for attempting to decrease the first temperature condition at said one of said one or more first locations for attempting to bring the heat distribution of the information system into conformance with the rule;

wherein the one or more first locations include a plurality of first computers and the one or more second locations include a plurality of second computers; and wherein each processing load of said first and said second computers is determined by amount of CPU usage, number of transactions per unit time, and amount of transferred data per unit time for process of said each processing load, wherein there are a plurality of said first sections and a plurality of said second sections, wherein the heat distribution rule designates said first sections to be high temperature sections and said second sections to be low temperature sections, and wherein the heat distribution rule is implemented by assigning a higher processing load to the first computers in the high temperature first sections than to the second computers in the low temperature second sections.

15. The method according to claim 14, wherein the step of monitoring the temperature conditions at the one or more first locations and the one or more second locations includes receiving temperature readings from temperature sensors associated with said one or more first locations and said one or more second locations.

16. The method according to claim 14, further comprising steps of:

providing virtual machine software for running one or more virtual machines on the first computer and the second computer; and relocating the portion of the processing load from the first computer to the second computer by relocating one or more virtual machines from the first computer to the second computer.

17. The method according to claim 14, further comprising steps of:

providing clustering software for running one or more processes on the plurality of first computers and the plurality of second computers; and relocating the portion of the processing load from the first computer to the second computer by relocating one or more processes from the first computer to the second computer.

18. The method according to claim 14, further comprising steps of:

providing at least one switch in communication with the plurality of first computers and the plurality of second computers, relocating the portion of the processing load from the first computer to the second computer by instructing the switch to adjust request assignment information to reduce the processing load of the first computer.

\* \* \* \* \*